(12) United States Patent
Shahparnia et al.

(10) Patent No.: US 10,061,444 B2
(45) Date of Patent: Aug. 28, 2018

(54) SELF CAPACITANCE TOUCH SENSING

(71) Applicant: Apple Inc., Cupertino, CA (US)

(72) Inventors: Shahrooz Shahparnia, Campbell, CA (US); Christoph H. Krah, Los Altos, CA (US)

(73) Assignee: Apple Inc., Cupertino (*) Notice: Subject to any disclaimer, the term of this patent is extended or adjusted under 35 U.S.C. 154(b) by 228 days.

(21) Appl. No.: 14/067,870

(22) Filed: Oct. 30, 2013

(65) Prior Publication Data

US 2015/0035787 A1   Feb. 5, 2015

Related U.S. Application Data

(60) Provisional application No. 61/860,632, filed on Jul. 31, 2013.

(51) Int. Cl.
*G06F 3/041* (2006.01)
*G06F 3/044* (2006.01)
*G06F 1/32* (2006.01)

(52) U.S. Cl.
CPC ............ *G06F 3/044* (2013.01); *G06F 1/3262* (2013.01); *G06F 3/0418* (2013.01)

(58) Field of Classification Search
USPC .................................................. 345/173–179
See application file for complete search history.

(56) References Cited

U.S. PATENT DOCUMENTS

| | | | |
|---|---|---|---|
| 4,667,146 A * | 5/1987 | Addis | G05F 1/561 323/316 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,841,427 A | 11/1998 | Tetetwak | |
| 5,880,411 A | 3/1999 | Gillespie et al. | |
| 6,188,391 B1 | 2/2001 | Seely et al. | |

(Continued)

FOREIGN PATENT DOCUMENTS

| | | |
|---|---|---|
| JP | 2000-163031 A | 6/2000 |
| JP | 2002-34203 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Alexander Eisen
*Assistant Examiner* — Nelson Lam
(74) *Attorney, Agent, or Firm* — Morrison and Foerster LLP

(57) ABSTRACT

Self capacitance touch circuits to cancel the effects of parasitic capacitance in a touch sensitive device are disclosed. One circuit can generate a parasitic capacitance cancelation signal that can be injected into touch sensing circuitry to cancel the parasitic capacitance. Another circuit can adjust the phase and magnitude of the parasitic capacitance cancelation signal based on characteristics of channels in the touch sensing circuitry so as to fine tune the parasitic capacitance cancelations. Another circuit can drive a guard plate and touch panel electrodes so as to cancel the parasitic capacitances between the panel and the plate and between the electrodes.

23 Claims, 15 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,577,157 B1* | 6/2003 | Cheung .............. H03K 19/1732 326/38 |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,868,875 B2 | 1/2011 | Park et al. |
| 8,446,158 B1* | 5/2013 | Jansson .............. H03K 17/9622 324/601 |
| 8,479,122 B2 | 7/2013 | Hotelling et al. |
| 9,377,907 B2 | 6/2016 | Shahparnia |
| 2005/0278403 A1* | 12/2005 | Miller .................. G06F 1/0353 708/270 |
| 2006/0092032 A1* | 5/2006 | Manlove ................ G01L 1/144 340/667 |
| 2006/0158229 A1* | 7/2006 | Hsu ........................ H03K 5/19 327/20 |
| 2006/0197753 A1 | 9/2006 | Hotelling |
| 2008/0032754 A1* | 2/2008 | Kim ........................ G09G 3/20 455/574 |
| 2008/0069284 A1* | 3/2008 | Kuhns .................... G06F 1/025 375/376 |
| 2008/0142352 A1 | 6/2008 | Wright |
| 2008/0157893 A1 | 7/2008 | Krah |
| 2008/0158178 A1 | 7/2008 | Hotelling et al. |
| 2008/0309622 A1 | 12/2008 | Krah |
| 2008/0309625 A1* | 12/2008 | Krah ...................... G06F 3/041 345/173 |
| 2009/0153152 A1 | 6/2009 | Maharyta et al. |
| 2010/0060593 A1 | 3/2010 | Krah |
| 2010/0060608 A1* | 3/2010 | Yousefpor ............. G06F 3/0418 345/174 |
| 2010/0073301 A1* | 3/2010 | Yousefpor ............. G06F 3/044 345/173 |
| 2010/0079401 A1* | 4/2010 | Staton .................... G06F 3/044 345/174 |
| 2011/0053519 A1* | 3/2011 | Jarabek ................ H04W 88/06 455/68 |
| 2011/0193817 A1 | 8/2011 | Byun et al. |
| 2011/0242050 A1* | 10/2011 | Byun ...................... G06F 3/044 345/174 |
| 2012/0044198 A1* | 2/2012 | Chai ....................... G06F 3/044 345/174 |
| 2012/0218222 A1* | 8/2012 | Shen ...................... G06F 3/044 345/174 |
| 2013/0069905 A1* | 3/2013 | Krah ...................... G06F 3/044 345/174 |
| 2013/0285971 A1* | 10/2013 | Elias ...................... G06F 3/044 345/174 |
| 2013/0285973 A1* | 10/2013 | Elias ...................... G06F 3/044 345/174 |
| 2014/0085246 A1* | 3/2014 | Shahparnia ........... G06F 3/0418 345/174 |
| 2014/0145997 A1* | 5/2014 | Tiruvuru ............... G06F 3/0416 345/174 |
| 2014/0192011 A1* | 7/2014 | Min ........................ G06F 3/044 345/174 |
| 2015/0009052 A1* | 1/2015 | Bogner .............. G01R 31/2884 341/120 |
| 2015/0035768 A1* | 2/2015 | Shahparnia ............. G06F 3/041 345/173 |
| 2015/0035769 A1* | 2/2015 | Shahparnia ............. G06F 3/041 345/173 |
| 2015/0035797 A1* | 2/2015 | Shahparnia ............. G06F 3/041 345/174 |
| 2015/0153398 A1* | 6/2015 | Bakken .............. G01R 27/2605 702/65 |
| 2016/0098123 A1* | 4/2016 | Bakken .............. G01R 27/2605 345/174 |
| 2016/0117017 A1* | 4/2016 | Kremin .............. G01R 27/2605 345/174 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

U.S. Appl. No. 13/624,718, filed Sep. 21, 2012, by Shahparnia et al. (copy not attached.).

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action dated Oct. 23, 2014, for U.S. Appl. No. 13/624,718, filed Sep. 21, 2102, 29 pages.

Non-Final Office Action dated Aug. 13, 2015, for U.S. Appl. No. 13/624,718, filed Sep. 21, 2102, 26 pages.

Notice of Allowance dated Feb. 25, 2016, for U.S. Appl. No. 13/624,718, filed Sep. 21, 2012, 11 pages.

* cited by examiner

SELF CAPACITANCE TOUCH SENSING

FIELD

This relates generally to self capacitance touch sensing and, more specifically, to canceling the effects of parasitic capacitance in a touch panel for self capacitance touch sensing.

BACKGROUND

Many types of input devices are presently available for performing operations in a computing system, such as buttons or keys, mice, trackballs, joysticks, touch panels, touch screens and the like. Touch sensitive devices, and touch screens in particular, are quite popular because of their ease and versatility of operation as well as their affordable prices. A touch sensitive device can include a touch panel, which can be a clear panel with a touch sensitive surface, and a display device such as a liquid crystal display (LCD) that can be positioned partially or fully behind the panel so that the touch sensitive surface can cover at least a portion of the viewable area of the display device. The touch sensitive device can allow a user to perform various functions by touching or hovering over the touch panel using a finger, stylus or other object at a location often dictated by a user interface (UI) being displayed by the display device. In general, the touch sensitive device can recognize a touch or hover event and the position of the event on the touch panel, and the computing system can then interpret the event in accordance with the display appearing at the time of the event, and thereafter can perform one or more actions based on the event.

An unwanted capacitance can arise between conductive components in close proximity in a touch sensitive device. This capacitance, called parasitic capacitance, can adversely affect how accurately a touch or hover event is recognized in the device. Parasitic capacitance can be particularly problematic when the touch or hover event is based on self capacitance.

SUMMARY

This relates to circuits to cancel the effects of parasitic capacitance in a touch sensitive device for self capacitance touch sensing. One circuit can generate a parasitic capacitance cancelation signal that can be injected into touch sensing circuitry to cancel the parasitic capacitance. Another circuit can adjust the phase and magnitude of the parasitic capacitance cancelation signal based on characteristics of channels in the touch sensing circuitry so as to fine tune the parasitic capacitance cancelations. Another circuit can drive a guard plate and touch panel electrodes so as to cancel the parasitic capacitances between the panel and the plate and between the electrodes. Touch sensitive devices with the effects of parasitic capacitance canceled therefrom can realize improved signal-to-noise ratios in self capacitance touch signals, a high dynamic sensing range, and power savings.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

This relates to circuits to cancel the effects of parasitic capacitance in a touch sensitive device for self capacitance touch sensing. In some examples, a circuit can generate a parasitic capacitance cancelation signal that can be injected into touch sensing circuitry to cancel the parasitic capacitance. In some examples, a circuit can adjust the phase and magnitude of the parasitic capacitance cancelation signal based on characteristics of channels in the touch sensing circuitry so as to fine tune the parasitic capacitance cancelations. In some examples, a circuit can drive a guard plate and touch panel electrodes so as to cancel the parasitic capacitances between the panel and the plate and between the electrodes. In some examples, a circuit can adjust common mode components in the touch sensing circuitry to conserve power.

Touch sensitive devices with the effects of parasitic capacitance canceled therefrom according to various examples can realize improved signal-to-noise ratios in self capacitance touch signals, a high dynamic sensing range, and power savings.

Figure 1:
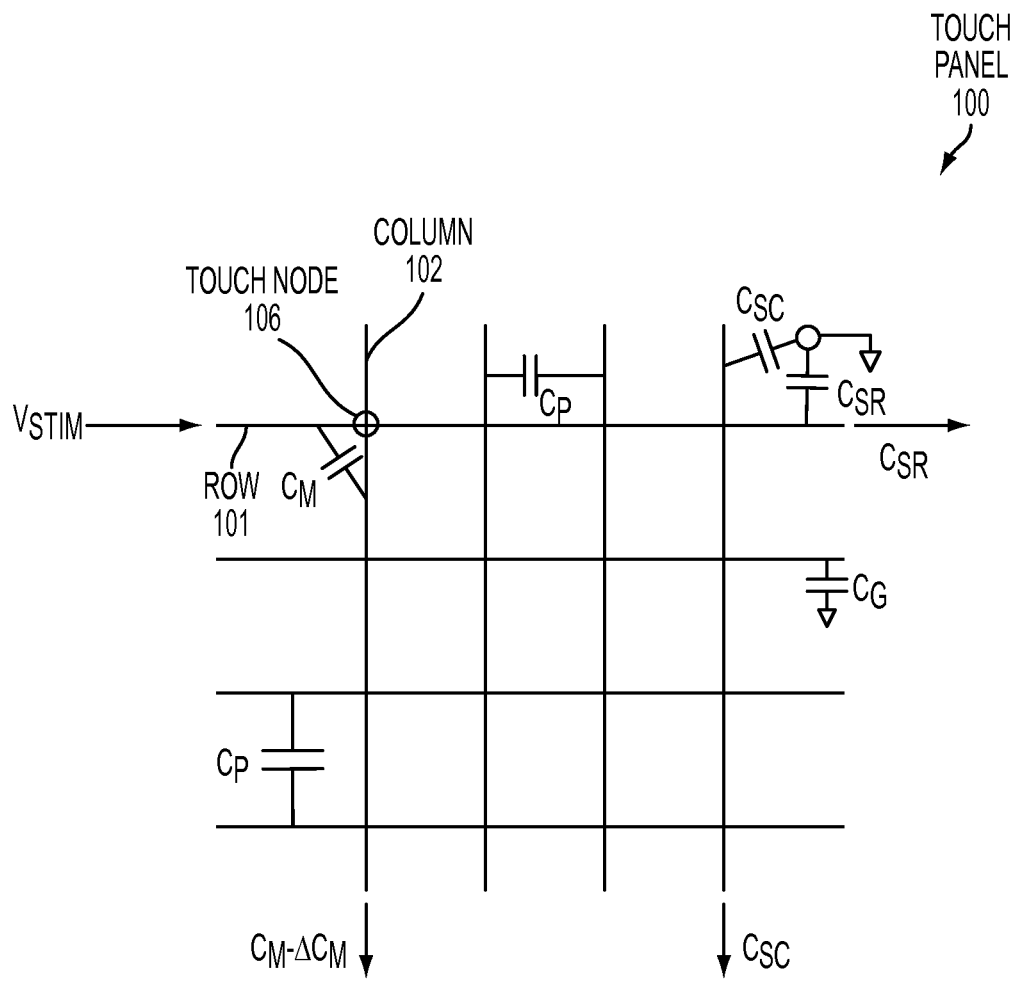
FIG. 1 illustrates an exemplary touch panel that can be used for self capacitance touch sensing according to various examples.

FIG. 1 illustrates an exemplary touch panel in a touch sensitive device. In the example of FIG. 1, touch panel 100 can include an array of touch nodes 106 formed at the crossing points of row conductive traces 101 and column conductive traces 102, although it should be understood that other node configurations can be employed. The panel 100 can operate in at least two touch sensing modes—a self capacitance mode and a mutual capacitance mode. During the self capacitance mode, the row traces 101 and the column traces 102 can act as touch electrodes (or nodes) that have a self capacitance to ground Cg. When an object touches or hovers over the trace 101, an additional self capacitance Csr can form between the object and the trace, thereby increasing the self capacitance at the trace. This self capacitance change can be transmitted to sense circuitry (not shown) coupled to the trace 101 to indicate the touch or hover and its location. Similarly, when an object touches or hovers over a column trace 102, an additional self capacitance Csc can form between the object and the trace and be transmitted to the sense circuitry for processing.

During the mutual capacitance mode, the row traces 101 and column traces 102 can form touch nodes 106 at their crossing points and have a mutual capacitance Cm at the nodes. A row trace 101 can act as a drive line coupled to the drive circuitry to stimulate the trace to drive the panel 100. A column trace 102 can act as a sense line coupled to the sense circuitry to transmit mutual capacitance signals thereto. When an object touches or hovers over the touch node 106 formed by the crossing row trace 101 and column trace 102, the mutual capacitance Cm can be reduced by ΔCm, corresponding to the amount of charge shunted through the object to ground. This mutual capacitance change can be transmitted to the sense circuitry coupled to the column trace 102 to indicate the touch or hover and its location. Similarly, the column trace 102 can be coupled to the drive circuitry to stimulate the trace and the row trace 101 can be coupled to the sense circuitry to transmit the mutual capacitance signal (Cm−ΔCm) for processing.

Parasitic capacitance Cp can be derived from various sources in and around the panel 100 so as to affect how accurately sense circuitry can detect capacitance changes created by the touching or hovering object. Here, parasitic capacitance Cp is shown between adjacent row traces 101 and column traces 102, although other sources of parasitic capacitance are also possible, as will be described herein. The effects of parasitic capacitance can include lower signal-to-noise ratio of the desired signal, a decreased dynamic sensing range of the desired signal at the panel, higher power requirements, and the line. These effects can be particularly impactful in self capacitance touch signals due to the reduced spatial resolution in the self capacitance touch panel configuration and when detecting hovering objects, among other things. Accordingly, reducing the effects of parasitic capacitance in self capacitance touch sensing can be helpful.

Figure 2:
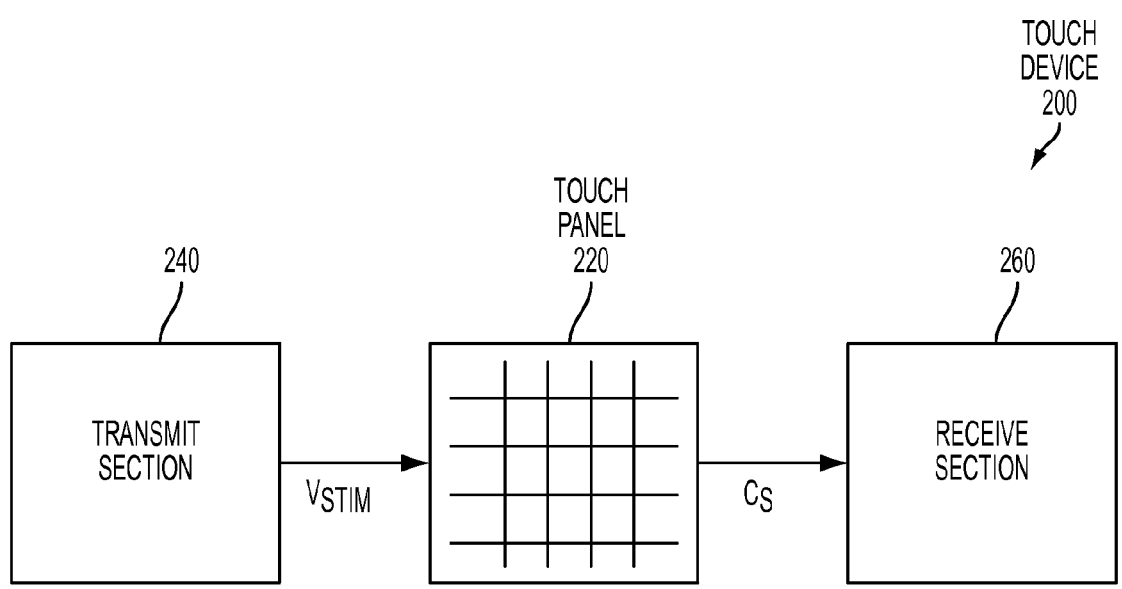
FIG. 2 illustrates an exemplary touch sensitive device that can be used for self capacitance touch sensing according to various examples.

FIG. 2 illustrates an exemplary touch sensitive device that can include the touch panel of FIG. 1, for example. In the example of FIG. 2, touch sensitive device 200 can include touch panel 220 to generate self capacitance signals indicative of touch or hover events at touch electrodes of the panel, transmit section 240 to generate and transmit the stimulation signals Vstim to the panel to drive the panel to generate the self capacitance signals, and receive section 260 to receive and process the self capacitance signals Cs from the panel. The transmit section 240 can include multiple transmit channels (not shown), each transmit channel having drive circuitry coupled to the touch electrodes (or nodes) to transmit the stimulation signals thereto. The receive section 260 can similarly include multiple receive channels (not shown), each receive channel having sense circuitry coupled to the touch electrodes (or nodes) to receive and process the self capacitance signals therefrom. As will be described in more detail below, cancelation circuitry can be included in the transmit section 240, the receive section 260, or both to cancel the effects of parasitic capacitance in the touch panel 220.

Figure 3:
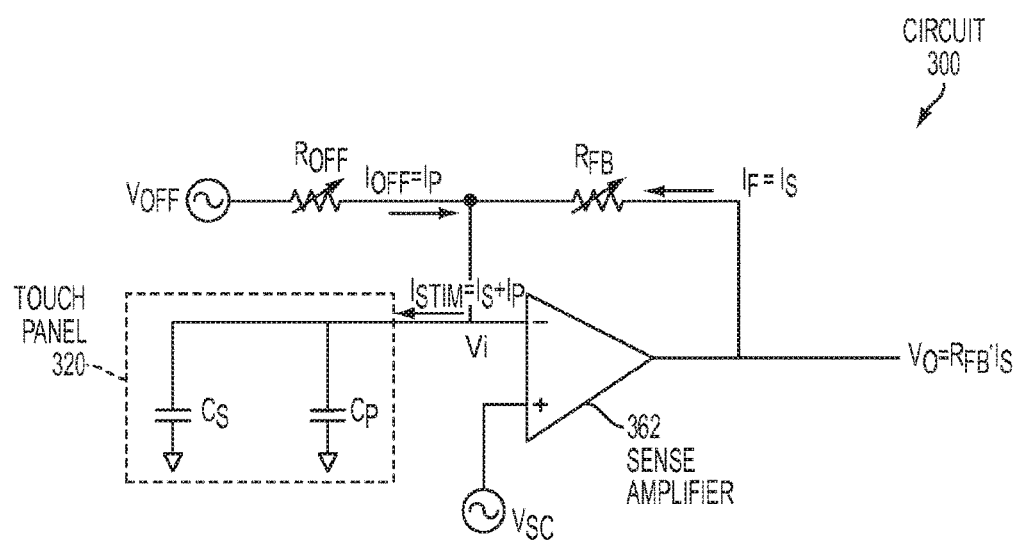
FIG. 3 illustrates an exemplary circuit that can generate a parasitic capacitance cancelation signal for self capacitance touch sensing according to various examples.

FIG. 3 illustrates an exemplary circuit that can generate a parasitic capacitance cancelation signal to cancel the effects of parasitic capacitance in a touch panel. In the example of FIG. 3, touch panel 320 can have self capacitance Cs indicative of a touch or hover event and unwanted parasitic capacitance Cp. The panel 320 can be coupled to sense amplifier 362 in the receive section to sense the self capacitance Cs and the parasitic capacitance Cp. The sense amplifier 362 can receive signal Vi at its inverting input and self capacitance stimulation signal Vsc at its non-inverting input and can output signal Vo. Vi can be correlated with the self capacitance Cs and the parasitic capacitance Cp. When the sense amplifier 362 operates in its linear range, the stimulation signal Vsc can match the signal Vi.

To cancel the effects of the parasitic capacitance Cp in signal Vi, cancelation signal Voff can be coupled into the inverting input of the sense amplifier 362 via resistor Roff so as to cancel current Ip associated with the parasitic capacitance Cp, thereby canceling from the output signal Vo the parasitic capacitance Cp and leaving the self capacitance Cs signal. More specifically, the magnitude and phase of the signal Voff can be adjusted so as to adjust the offset current Ioff such that the current Ioff matches the current Ip into the parasitic capacitance Cp, thereby canceling the parasitic capacitance Cp. The residual current Is=Istim−Ioff can be coupled through the feedback resistor Rfb such that the output Vo of the sense amplifier 362 can become Vo=Rfb*Is and be purely a function of the current Is. In some examples, the value of the cancelation signal Voff can be determined through calibration by adjusting the cancelation signal Voff and observing the output signal Vo at the sense amplifier 362. The cancelation signal Voff corresponding to the minimum output signal Vo can be selected as the optimal signal Voff for canceling the parasitic capacitance Cp. This cancelation signal Voff can then be applied to the circuit during operation to cancel the parasitic capacitance Cp.

Figure 4:
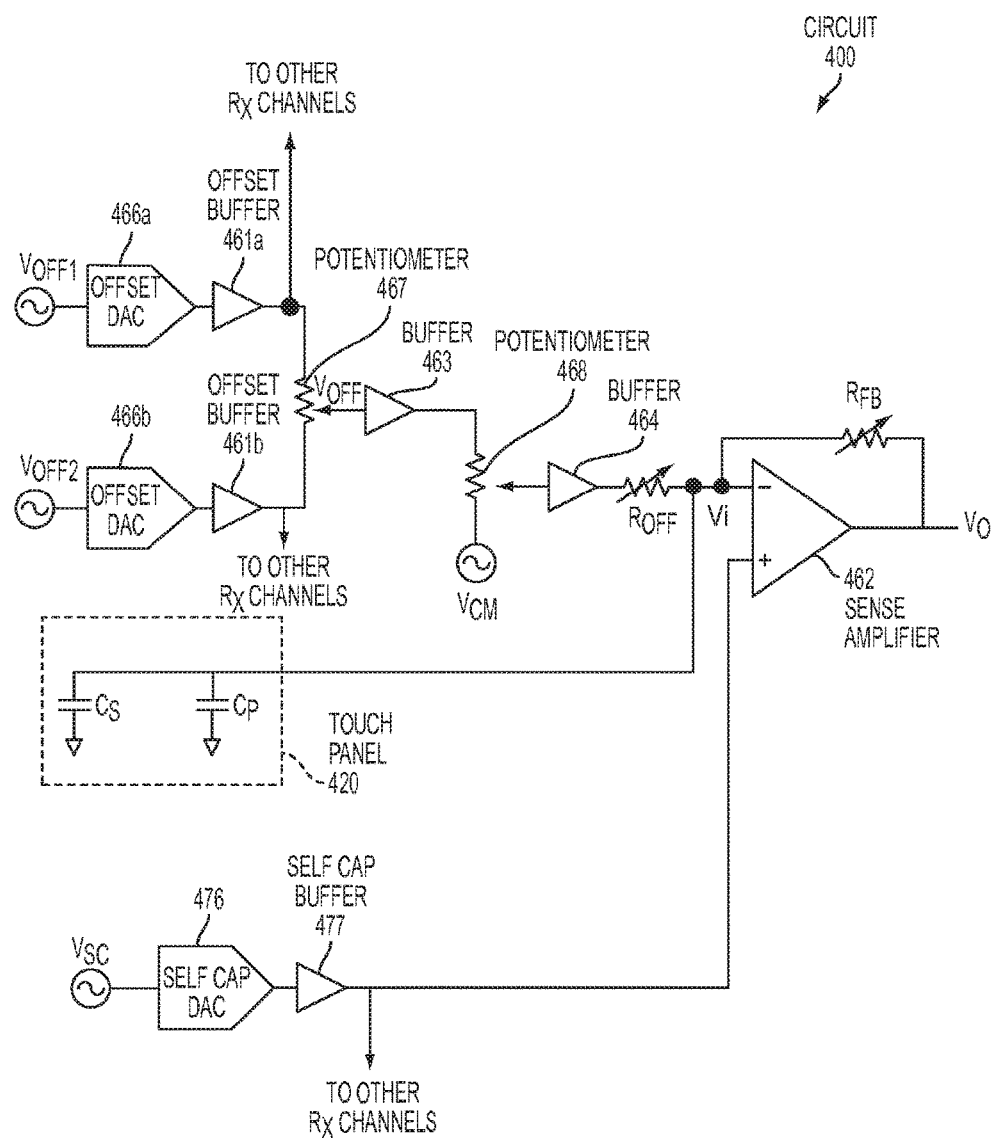
FIG. 4 illustrates an exemplary circuit that can adjust parasitic capacitance cancelation signal phase and magnitude so as to cancel the effects of parasitic capacitance for self capacitance touch sensing according to various examples.

Parasitic capacitance can vary from panel to panel and, within a panel, from electrode row to row and column to column, causing a variation in sense amplifier output which, in some instances, can be large enough to saturate the amplifier. To counter these variations, phase and magnitude adjustments can be made to the parasitic capacitance cancelation signals inputted to individual sense amplifiers. Hence, each receive channel (with its sense amplifier) can have individual phase and magnitude adjustments associated therewith, which can advantageously provide fine-tuned parasitic capacitance Cp cancelation. FIG. 4 illustrates an exemplary circuit that can adjust the phase and magnitude of the parasitic capacitance cancelation signal. In the example of FIG. 4, touch panel 420 can have self capacitance Cs indicative of a touch or hover event and unwanted parasitic capacitance Cp. The panel 420 can be coupled to sense amplifier 462 in the receive section, which can receive signal Vi from the panel at its inverting input and self capacitance stimulation signal Vsc at its non-inverting input and can output signal Vo. The stimulation signal Vsc can be generated by a numerically-controlled oscillator (NCO) (not shown), converted to an analog signal by self capacitance digital-to-analog converter (DAC) 476, and inputted to the non-inverting input of the sense amplifier 462 through self capacitance buffer 477.

To cancel the effects of the parasitic capacitance Cp in signal Vi, parasitic capacitance cancelation signals Voff1 and Voff2 can be generated by the NCO and used to create a phase- and magnitude-adjusted cancelation signal Voff to handle the particular parasitic capacitance variations affecting the sense amplifier 462. The adjusted cancelation signal Voff can then be coupled to signal Vi at the inverting input of the sense amplifier 462 so as to cancel from the output signal Vo the parasitic capacitance Cp and leave the self capacitance Cs signal.

To make the phase adjustment, cancelation signal Voff1 can have phase φ1 and cancelation signal Voff2 can have phase φ2, where φ1 can be a minimum acceptable phase of the cancelation signal and φ2 can be a maximum acceptable phase, relative to the self capacitance stimulation signal Vsc phase. The cancelation signals Voff1, Voff2 can be converted to analog signals by offset DACs 466a, 466b, respectively, and the analog signals from offset buffers 461a, 461b inputted to potentiometer 467. The potentiometer 467 can select a phase φ for the cancelation signal Voff between the phases φ1, φ2 of the inputted cancelation signals Voff1, Voff2, respectively. In some examples, the selected phase φ can be determined through calibration by varying the phase φ at the potentiometer 467 from the minimum φ1 to the maximum φ2 and observing the output signal Vo at the sense amplifier 462. The phase φ corresponding to the minimum output signal Vo can be selected as the optimal phase φ for canceling the parasitic capacitance Cp. The phase-adjusted cancelation signal Voff can be inputted to buffer 463 to await magnitude adjustment. In some examples, the buffer 463 can be optional.

To make the magnitude adjustment, the phase-adjusted cancelation signal Voff from the buffer 463 can be inputted to potentiometer 468. The potentiometer 468 can select a magnitude for the cancelation signal Voff relative to the common mode signal input Vcm. In some examples, the selected magnitude can be determined through calibration by varying the magnitude at the potentiometer 468 and observing the output signal Vo at the sense amplifier 462. The magnitude corresponding to the minimum output signal Vo can be selected as the optimal magnitude for canceling the parasitic capacitance Cp. The phase-adjusted, magnitude-adjusted cancelation signal Voff can be inputted to buffer 464 and the buffer output coupled to signal Vi at the inverting input of the sense amplifier 462. This cancelation signal Voff can be applied to the circuit during operation to cancel the parasitic capacitance Cp as well as prevent the parasitic capacitance Cp variations from saturating the sense amplifier 462.

Figure 5:
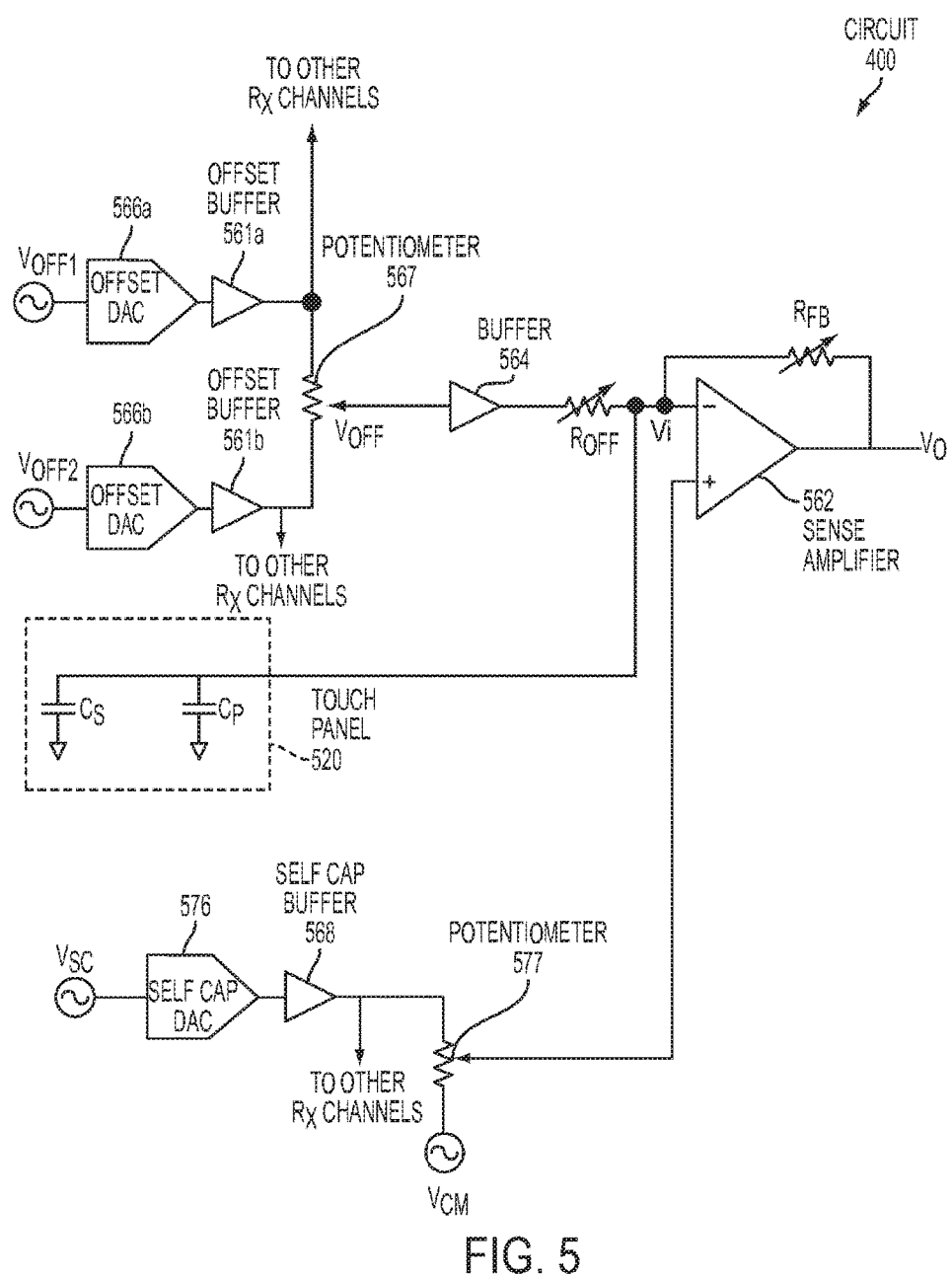
FIG. 5 illustrates another exemplary circuit that can adjust parasitic capacitance cancelation signal phase and magnitude so as to cancel the effects of parasitic capacitance for self capacitance touch sensing according to various examples.

FIG. 5 illustrates another exemplary circuit that can adjust the phase and magnitude of the parasitic capacitance cancelation signal. Similar to the circuit of FIG. 4, the circuit of FIG. 5 can include offset DACs 566a, 566b to convert cancelation signals Voff1, Voff2, respectively, generated by a NCO, to analog signals and potentiometer 567 to select a phase φ for the cancelation signal Voff between the phases φ1, φ2 of the inputted cancelation signals Voff1, Voff2. The phase-adjusted cancelation signal Voff can be inputted to buffer 564 and the buffer output coupled to signal Vi at the inverting input of the sense amplifier 562 for canceling the parasitic capacitance Cp.

Rather than adjust the magnitude of the cancelation signal Voff as in FIG. 4, the circuit of FIG. 5 can adjust the magnitude of the self capacitance stimulation signal Vsc inputted to the non-inverting input of the sense amplifier 562. As such, the magnitude of the cancelation signal Voff can be controlled by adjusting the magnitude of the stimulation signal Vsc. The stimulation signal Vsc can be generated by the NCO and converted to an analog signal through self capacitance DAC 576. The analog signal Vsc can be inputted to buffer 568 and the buffer output inputted to potentiometer 577. In some examples, the buffer 568 can be omitted. The potentiometer 577 can select a magnitude for the stimulation signal Vsc relative to the common mode signal input Vcm. In some examples, the magnitude can be selected in a similar manner to that of the cancelation signal magnitude in FIG. 4, where the phase of stimulation signal Vsc can be set to the phase of the phase-adjusted cancelation signal Voff and the magnitude corresponding to the minimum output signal Vo selected as the optimal magnitude for canceling the parasitic capacitance Cp. The magnitude-adjusted stimulation signal Vsc can be coupled to the non-inverting input of the sense amplifier 562 and together with the phase-adjusted cancelation signal Voff can cancel the parasitic capacitance Cp as well as prevent the parasitic capacitance Cp variations from saturating the amplifier. In some examples, the magnitude adjustments made to the stimulation signal Vsc can cause further phase adjustments in the cancelation signal so as to fine-tune the parasitic capacitance cancelations.

In some examples, the phase and magnitude adjustments can be made to the stimulation signal Vsc alone, while the phase of the cancelation signal Voff can remain global or static for all receive channels. In some examples, the phase adjustments can be made to the stimulation signal Vsc, while the magnitude adjustments can be made to the cancelation signal Voff, and vice versa.

Figure 6:
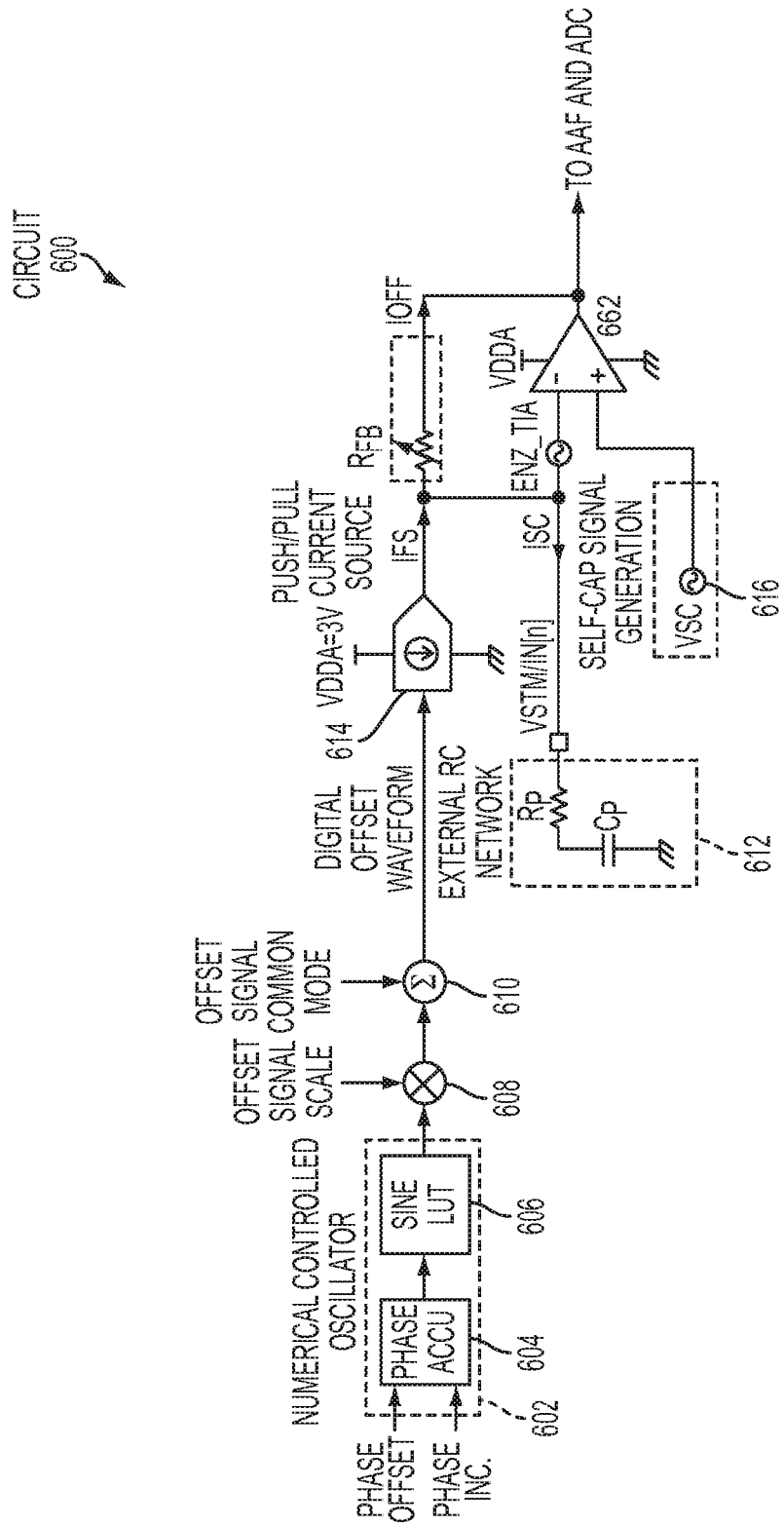
FIG. 6 illustrates another exemplary circuit that can adjust parasitic capacitance cancelation signal phase and magnitude so as to cancel the effects of parasitic capacitance for self capacitance touch sensing according to various examples.

FIG. 6 illustrates another exemplary circuit that can adjust the phase and magnitude of the parasitic capacitance cancelation signal. The circuit 600 can generate digital self capacitance offset signal that is then used to control a push/pull current source 614 that generates or sinks current at a particular magnitude and phase. The push/pull current source 614 can be controlled such that it generates a phase and magnitude adjusted cancelation signal IFS to handle the particular parasitic capacitance variations affecting the sense amplifier 662. A numerically controlled oscillator (NCO) 602 can be used to generate the digital offset signal. The NCO 602 can include a sine phase accumulator 604, and sine lookup table (LUT) 606. The programmable phase increment phase_inc can determine the frequency of the offset waveform. The programmable phase offset can control the phase of the signal. The phase accumulator 604 accumulates the sine phase increment phase_inc. The output of the sine phase accumulator 604 can represent an address into the sine lookup table 606. The synthesized waveform out of the sine lookup table 606 can have a constant amplitude and phase, the phase being set by the phase offset parameter. The signal outputted by the NCO 602 can be multiplied at 608 with an offset signal scale factor to control the amplitude. The common mode of the sinusoidal offset signal can be shifted by adding a static offset 610. This can cause the current DAC common mode and therefore the transimpedance amplifier's output common mode to shift accordingly. The generated digital offset waveform created can be used to control a push/pull current source 614 that can generate an offset current IFS. The offset current can be calibrated (i.e., the magnitude and phase can be adjusted) so as to cancel from the output signal Vo the parasitic capacitance Cp and leave the self capacitance Cs signal. The circuit 600 can be advantageous in that it may not require a separate offset buffer, a high voltage buffer or potentiometers in its implementation, thus simplifying offset signal generation. By not requiring a potentiometer in its implementation an improved SNR can be realized. The current sources in the push/pull current source 614 can have a high impedance compared to that of ROFF of the alternate examples and therefore the noise gain of the transimpedance amplifier can be lower and thus the SNR of this embodiment can be higher.

Figure 7:
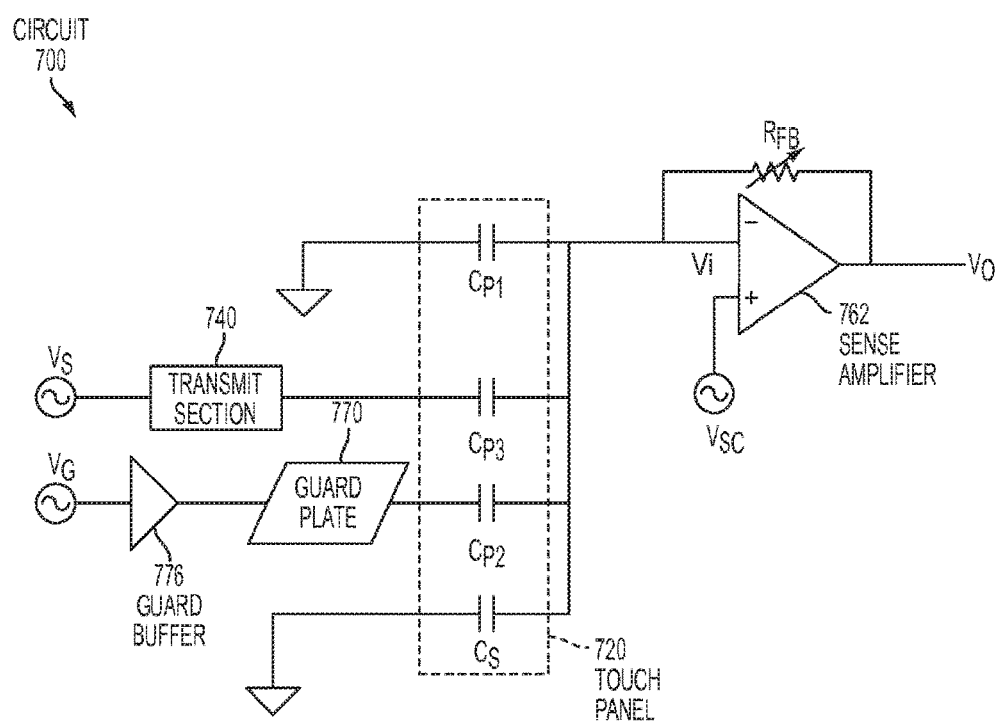
FIG. 7 illustrates an exemplary circuit that can use a touch panel guard and electrodes to cancel the effects of parasitic capacitance for self capacitance touch sensing according to various examples.

Parasitic capacitance can be derived from various sources in a touch sensitive device that employs a touch panel. Canceling the parasitic capacitances from one or more of these sources can mitigate the effects of the parasitic capacitance in the touch panel. FIG. 7 illustrates an exemplary circuit that can cancel the effects of parasitic capacitance derived from a guard plate in a touch sensitive device and from electrode rows and columns in a touch panel of the device. In the example of FIG. 7, touch panel 720 can have self capacitance Cs indicative of a touch or hover event and at least three different parasitic capacitances—parasitic capacitance Cp1 to ground, parasitic capacitance Cp2 to guard plate 770, and parasitic capacitance Cp3 between panel electrodes. The parasitic capacitance Cp3 can be the mutual capacitance between the driven row electrodes and proximate column electrodes and/or between the driven row electrodes and other proximate row electrodes, during row self capacitance touch sensing. Similarly, the parasitic capacitance Cp3 can be the mutual capacitance between the driven column electrodes and proximate row electrode and/or between the driven column electrodes and other proximate column electrodes, during column self capacitance sensing. The panel 720 can be coupled to sense amplifier 762 in the receive section to sense the self capacitance Cs and the parasitic capacitances Cp1, Cp2, Cp3. The sense amplifier 762 can receive signal Vi at its inverting input and self capacitance stimulation signal Vsc at its non-inverting input and can output signal Vo. Vi can be correlated with the self capacitance Cs, and the parasitic capacitances Cp1, Cp2, Cp3.

To cancel the effects of the parasitic capacitance Cp2, guard signal Vg can be generated and coupled to guard plate 770 via buffer 776. The guard signal Vg can be used to drive the guard plate 770 at a phase and magnitude substantially equal to that of the voltage at Vi, thereby substantially reducing the voltage across the parasitic capacitance Cp2 so as to cancel the effects of the parasitic capacitance Cp2 between the panel 720 and the plate. In some examples, the value of the guard signal Vg can be determined through calibration by varying the phase and/or magnitude of the guard signal and observing the output signal Vo at the sense amplifier 762. The guard signal Vg corresponding to the minimum output signal Vo can be selected as the optimal signal for canceling the parasitic capacitance Cp2. This guard signal Vg can then be applied to the circuit during operation to cancel the parasitic capacitance Cp2.

Similarly, to cancel the effects of the parasitic capacitance Cp3, shield signal Vs can be generated and selectively coupled to the electrodes in the touch panel 720. For example, when sensing self capacitance on row electrodes in the panel 720, the shield signal Vs can be coupled to the column electrodes in the panel. Conversely, when sensing self capacitance on column electrodes, the shield signal Vs can be coupled to the row electrodes. The shield signal Vs can be used to drive the selected electrodes at substantially the same phase and magnitude as the signal Vi (and therefore signal Vsc), thereby canceling the parasitic capacitance Cp3 between the selected electrodes. In some examples, the value of the shield signal Vs can be determined through calibration by varying the phase and/or magnitude of the shield signal and observing the output signal Vo at the sense amplifier 762. The shield signal Vs corresponding to the minimum output signal Vo can be selected as the optimal signal for canceling the parasitic capacitance Cp3. This shield signal Vs can be applied to the circuit during operation to cancel the parasitic capacitance Cp3. In some examples, the stimulation signal Vsc inputted to the non-inverting input of the sense amplifier 762, rather than a shield signal Vs, can be used to drive the electrodes in the panel 720 so as to cancel the effects of the parasitic capacitance Cp3.

In some examples, the guard signal Vg alone, the shield signal Vs alone, or both together can be applied to cancel parasitic capacitance in the touch panel.

Figure 8:
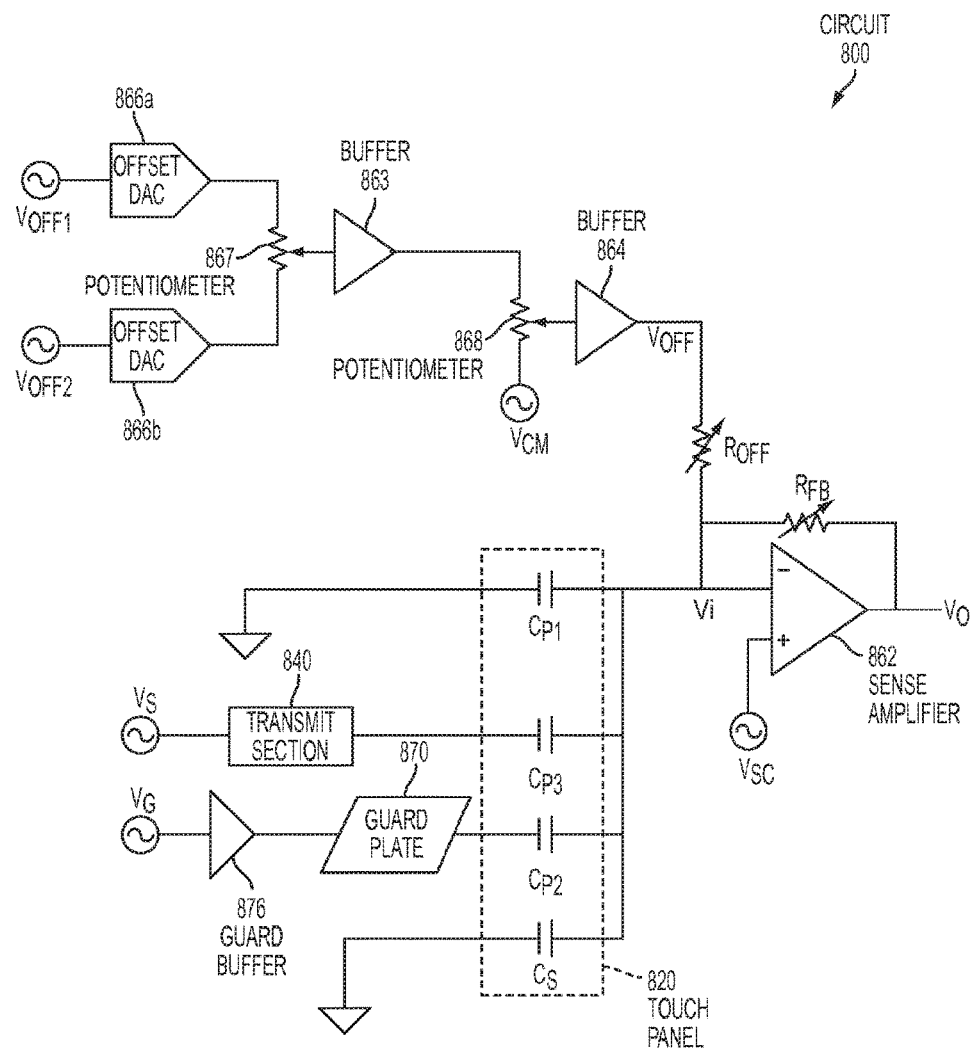
FIG. 8 illustrates an exemplary circuit that can use multiple parasitic capacitance cancelation circuits for self capacitance touch sensing according to various examples.

The circuits of FIGS. 3 through 7 can be used in various combinations to cancel parasitic capacitance in a touch panel. FIG. 8 illustrates an exemplary circuit that combines the phase and magnitude adjustment circuit of FIG. 4 with the guard and shield circuit of FIG. 7. As such, the circuit of FIG. 8 can provide a phase- and magnitude-adjusted cancelation signal Voff, as described in FIG. 4, and an input signal Vi with mitigated guard plate and panel electrode parasitic capacitances, as described in FIG. 6, so as to cancel parasitic capacitance in the touch panel 820. Other combinations can include the cancelation circuit of FIG. 3 with the guard and shield circuit of FIG. 6; the phase and magnitude adjustment circuit of FIG. 5 with the guard and shield circuit of FIG. 6; and the like.

Accordingly, a parasitic capacitance cancelation circuit can operate in various cancelation modes, depending on the cancelation circuitry used, including: (a) stand-alone cancelation signal mode to apply the cancelation signal Voff, as illustrated in FIG. 3, for example; (b) a combination of cancelation signal and guard mode to apply the cancelation signal Voff and the guard signal Vg, as illustrated in FIGS. 3 and 7, for example; (c) a combination of cancelation signal and shield mode to apply the cancelation signal Voff and the shield signal Vs (or the self capacitance stimulation signal Vsc), as illustrated in FIGS. 3 and 7, for example; (d) a combination of cancelation signal, guard, and shield mode to apply the cancelation signal Voff, the guard signal Vg, and the shield signal Vs (or the stimulation signal Vsc), as illustrated FIGS. 3 and 6, for example; (e) stand-alone guard signal mode to apply the guard signal Vg, as illustrated in FIG. 6, for example; (f) a combination of guard and shield signal mode to apply the guard signal Vg and the shield signal Vs (or the stimulation signal Vsc), as illustrated in FIG. 7, for example; (g) stand-alone shield signal mode to apply the shield signal Vs (or the stimulation signal Vsc), as illustrated in FIG. 6, for example; (g) stand-alone phase and magnitude adjustment mode to apply the phase- and magnitude-adjusted cancelation signal Voff, as illustrated in FIGS. 4 and 5, for example; (h) a combination of phase and magnitude adjustment and guard mode to apply the phase- and magnitude-adjusted cancelation signal Voff and the guard signal Vg, as illustrated in FIGS. 4 through 8, for example; (i) a combination of phase and magnitude adjustment and shield mode to apply the phase- and magnitude-adjusted cancelation signal Voff and the shield signal Vs (or the stimulation signal Vsc), as illustrated in FIGS. 4 through 8, for example; (j) a combination of phase and magnitude adjustment, guard, and shield mode to apply the phase- and magnitude-adjusted cancelation signal Voff, the guard signal Vg, and the shield signal Vs (or the stimulation signal Vsc), as illustrated in FIGS. 4 through 8, for example; (k) stand-alone phase and magnitude adjustment mode to apply phase- and magnitude-adjusted cancelation signal Voff, where each receive channel can have a global offset phase and magnitude, where the global phase/magnitude can be the average/median phase/magnitude across all receive channels; (l) stand-alone phase and magnitude adjustment mode to apply phase- and magnitude-adjusted cancelation signal Voff, where each receive channel can have per channel offset phase and magnitude, where the per channel/phase magnitude can be optimized for a given channel; and (m) a self capacitance off mode in which the touch panel does not perform self capacitance touch sensing. Additional and/or other modes suitable for canceling parasitic capacitance in a touch panel can also be used according to various examples.

Figure 9:
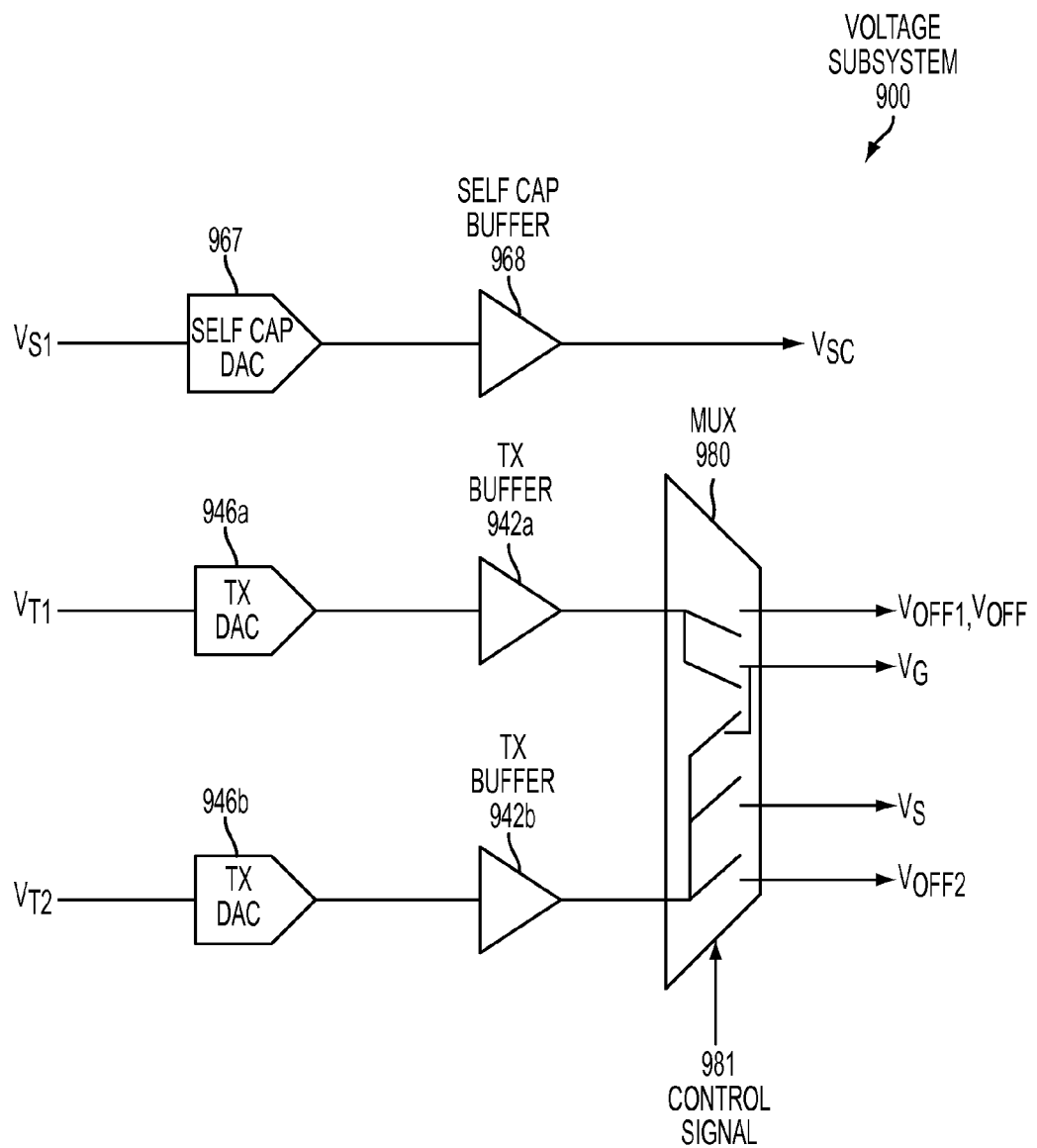
FIG. 9 illustrates an exemplary voltage subsystem of a touch sensitive device for self capacitance touch sensing according to various examples.

As described previously, various signals, e.g., Vsc, Voff, Voff1, Voff2, Vg, and Vs, can be generated to facilitate the cancelation of parasitic capacitance effects. FIG. 8 illustrates an exemplary voltage subsystem of a touch sensitive device that can be used to generate these signals. The subsystem or portions thereof can reside in the transmit section, the receive section, or both of the device. In the example of FIG. 9, voltage subsystem 900 can include a voltage source to provide input signal Vs1 for generating the self capacitance stimulation signal Vsc. Here, signal Vs1 can be converted to an analog signal by self capacitance DAC 967 and inputted to DAC buffer 968. The buffer 968 can output the stimulation signal Vsc to the non-inverting input of the sense amplifier to facilitate parasitic capacitance cancelation, for example, as illustrated in FIGS. 3 through 7. In some examples, the stimulation signal Vsc can also be used, instead of the shield signal Vs, to selectively drive panel electrodes to cancel the effects of the electrodes' parasitic capacitance.

The subsystem 900 can also include one or more voltage sources to provide input signals Vt1, Vt2 for generating the cancelation signals Voff, Voff1, Voff2, the guard signal Vg, and the shield signal Vs. Here, signals Vt1, Vt2 can be converted to analog signals by transmit DACs 946a, 946b and inputted to DAC buffers 942a, 942b, respectively. The buffers 942a, 942b can output the signals Vt1, Vt2 to multiplexer (MUX) 980, which can use control signal 981 to determine the usage of the signals Vt1, Vt2 according to the type of cancelation to be done. For example, to generate the cancelation signal Voff, as in FIG. 3, the MUX 980 can connect the signal Vt1 to the Voff input line. To generate the cancelation signals Voff1, Voff2, as in FIGS. 4, 5, and 7, the MUX 980 can connect the signal Vt1 to the Voff1 input line and the signal Vt2 to the Voff2 input line. To generate the guard signal Vg, as in FIGS. 6 and 7, the MUX 980 can connect the signal Vt1 to the Vg input line. To generate the shield signal Vs, as in FIGS. 6 and 7, the MUX 980 can connect the signal Vt2 to the Vs input line. To generate the guard signal Vg and the shield signal Vs together, as in FIGS. 6 and 7, the MUX 980 can connect the signal Vt2 concurrently to the Vg and Vs input lines. Note that signals Voff1, Voff2, Vg and Vs can be generated by dedicated DACs, in which case 4 DACs can be used and MUX 980 omitted.

Power conservation can be achieved in the circuits of FIGS. 3 through 8, particularly in the sense amplifiers, as follows. As shown in FIGS. 3 through 8, cancelation signal Voff (coupled to the input signal Vi) and self capacitance stimulation signal Vsc can be inputted to the sense amplifier to cancel the parasitic capacitance in the touch panel. These signals Voff, Vsc can have a common mode component Voff_cm and Vsc_cm, respectively, that can determine the common mode component Vo_cm in the output signal Vo from the sense amplifier. By adjusting the common mode component Voff_cm, Vsc_cm of the signals Voff, Vsc, respectively, the common mode component Vo_cm in the output signal Vo from the sense amplifier can be shifted below the common mode level of signals Vsc and Voff, therefore enabling the sense-amplifier's output stage to be run at a substantially lower supply than the sense amplifier's input stages, thus conserving power. The output common mode Vo_cm of the sense amplifier can be defined as:

$$Vo\_cm = Vsc\_cm - (Voff\_cm - Vsc\_cm) * Rfb / Roff.$$

The common mode adjustments to the signals Voff, Vsc can be made during factory calibration of the touch subsystem.

Figure 10:
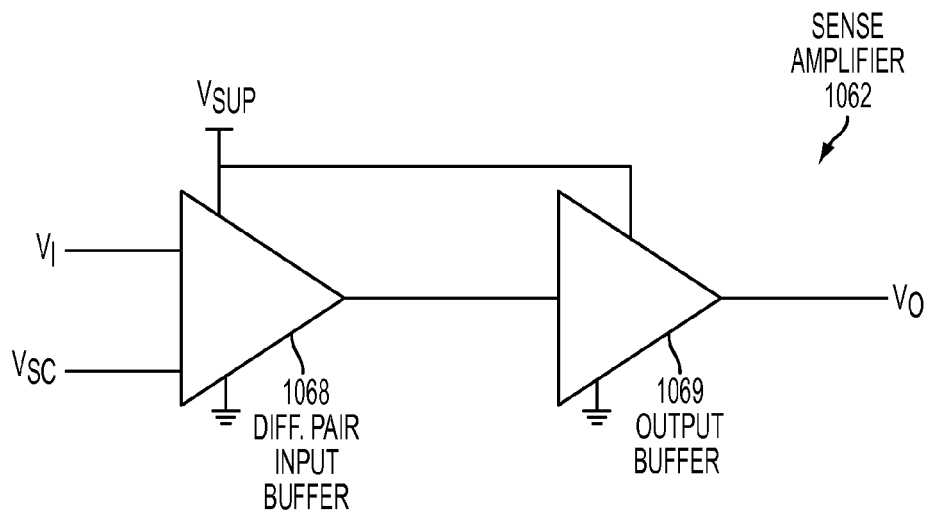
FIG. 10 illustrates an exemplary sense amplifier that can conserve power for self capacitance touch sensing according to various examples.

FIG. 10 illustrates an exemplary sense amplifier that can conserve power during operation. In the example of FIG. 10, sense amplifier 1062 can include differential pair input buffer 1068 having a first input for input signal Vi (which includes cancelation signal Voff) and a second input for self capacitance stimulation signal Vsc. The sense amplifier 1062 can further include output buffer 1069 having an input for the differential buffer output and can output the signal Vo from the amplifier 1062. Both buffers 1068, 1069 can be powered by voltage supply Vsup. The amplifier 1062 can receive common mode-adjusted input signals Vi, Vsc, and can output common mode-adjusted output signal Vo, as described previously. The differential pair input buffer 1068 can be designed to have a common mode input range greater than Vsup and large enough to accommodate voltage levels required by signals Vi and Vsc. As such, the amplifier 1062 can operate from a supply Vsup substantially below the voltage levels of signals Vi and Vsc. The sense amplifier 1062 can be used in any of FIGS. 3 through 8.

Figure 11:
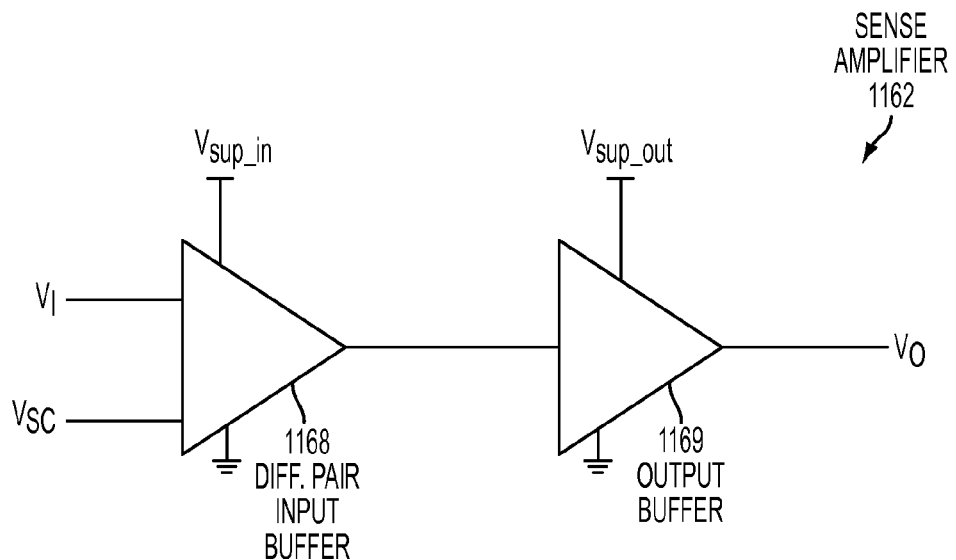
FIG. 11 illustrates another exemplary sense amplifier that can conserve power for self capacitance touch sensing according to various examples.

FIG. 11 illustrates another exemplary sense amplifier that can conserve power during operation. The amplifier of FIG. 11 is the same as the amplifier of FIG. 10 except that different voltage supplies can power the two buffers. In the example of FIG. 11, sense amplifier 1162 can power differential pair input buffer 1168 with voltage supply Vsup_in and output buffer 1168 with voltage supply Vsup_out, where Vsup_in can be large enough to accommodate voltage levels required by signals Vi and Vsc, more specifically, where Vsup_in can be sized such that the voltage level required by signals Vi and Vsc can be within the common mode range of the input differential pair input buffer. In this example, the power savings can occur at the output buffer 1168. The sense amplifier 1162 can be used in any of FIGS. 3 through 7.

Figure 12:
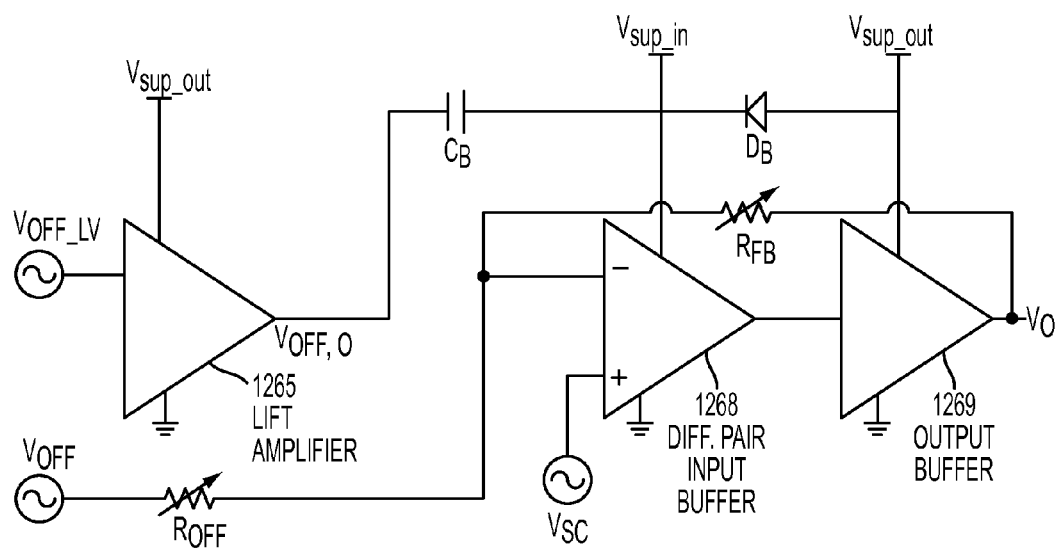
FIG. 12 illustrates an exemplary circuit that can conserve power for self capacitance touch sensing according to various examples.

FIG. 12 illustrates an exemplary circuit coupled to a sense amplifier that can conserve power during operation by amplifying the output signal Vo from the amplifier. In the example of FIG. 12, the input voltage supply Vsup_in to sense amplifier 1262 can be intermittently boosted to ensure the sense amplifier's input signals Voff and Vsc can remain within the common mode range of the input stage when the voltage levels of Voff and/or VSC are above Vsup_out. By intermittently boosting the supply voltage to the amplifier 1262 rather than sustaining a higher voltage supply, power can be conserved during amplifier operation. To perform the intermittent boost, lift amplifier 1265 can drive bootstrap capacitor Cb via lift amplifier 1265 in unity gain configuration with a low voltage version Voff_lv of offset compensation signal Voff in one example. A bootstrap diode Db can hold the positive terminal of bootstrap capacitor Cb one forward voltage drop Vfw below Vsup_out at negative peaks of signal Voff_lv. As the cancelation signal Voff_lv increases, the negative terminal of bootstrap capacitor Cb can increase, raising the voltage on the positive terminal of bootstrap capacitor Cb from (Vsup_out−Vfw) at the negative peak of Voff_lv to (Voff_lv+Vsup_out−Vfw) at the positive peak of Voff_lv. As a result, the effective power to the sense amplifier 1262 can be substantially lower because the boost occurs only when Voff is approximately at or above Vsup_out. This circuit can be included in any of the circuits of FIGS. 3 through 7.

For simplicity, in some instances, the DACs associated with the voltage signals in FIGS. 3 through 12, e.g., Voff, Voff1, Voff2, Vg, Vs, Vstim, Vsc, have been omitted. However, it should be understood that a DAC can be used to convert the voltage signals from digital to analog, according to the requirements of the circuit.

Figure 13:
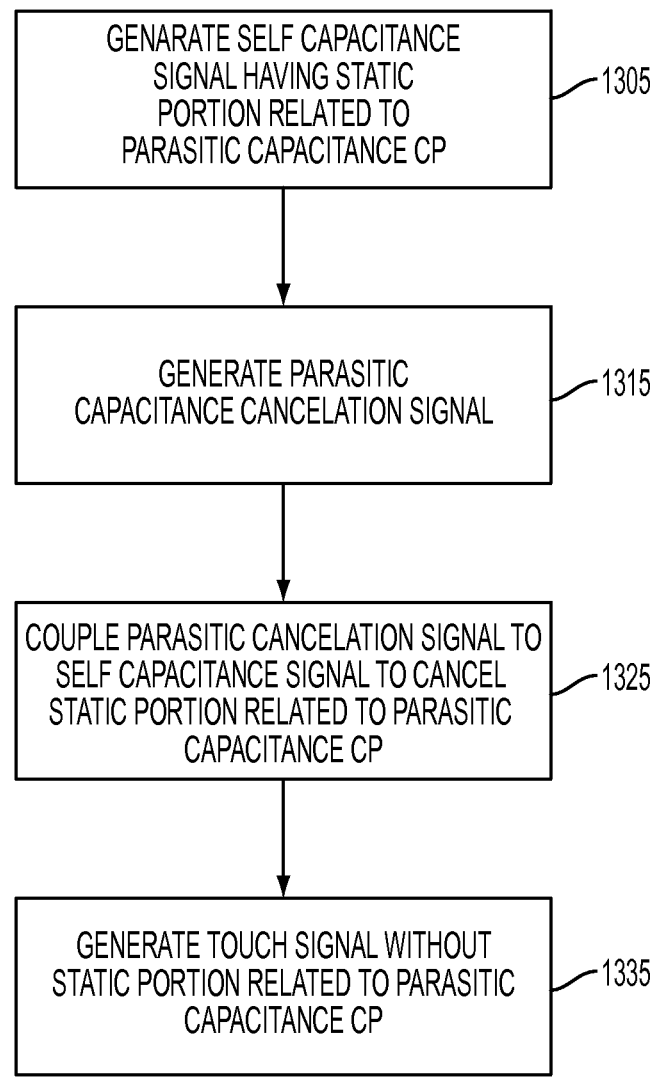
FIG. 13 illustrates an exemplary method to cancel the effects of parasitic capacitance for self capacitance touch sensing according to various examples.

FIG. 13 illustrates an exemplary method to cancel the effects of parasitic capacitance in a touch sensitive device using any of the circuits of FIGS. 3 through 13, for example. In the example of FIG. 13, a self capacitance signal can be generated (1305). The self capacitance signal can include a static portion associated with parasitic capacitance(s) derived from one or more sources in the device. One or more parasitic capacitance cancelation signals can be generated (1315). The parasitic capacitance cancelation signals can be generated using any of the circuits of FIGS. 3 through 9. The cancelation signals can be coupled to the self capacitance signal to cancel the static portions associated with the parasitic capacitance (s) therefrom (1325). A self capacitance touch signal can be generated from the self capacitance signal, absent from the static portions related to the parasitic capacitance(s) (1335). The touch signal can be generated at a sense circuit in the device in response to the self capacitance signal.

It should be understood that additional and/or other methods can also be used that are capable of canceling the effects of parasitic capacitance in a touch panel.

Figure 14:
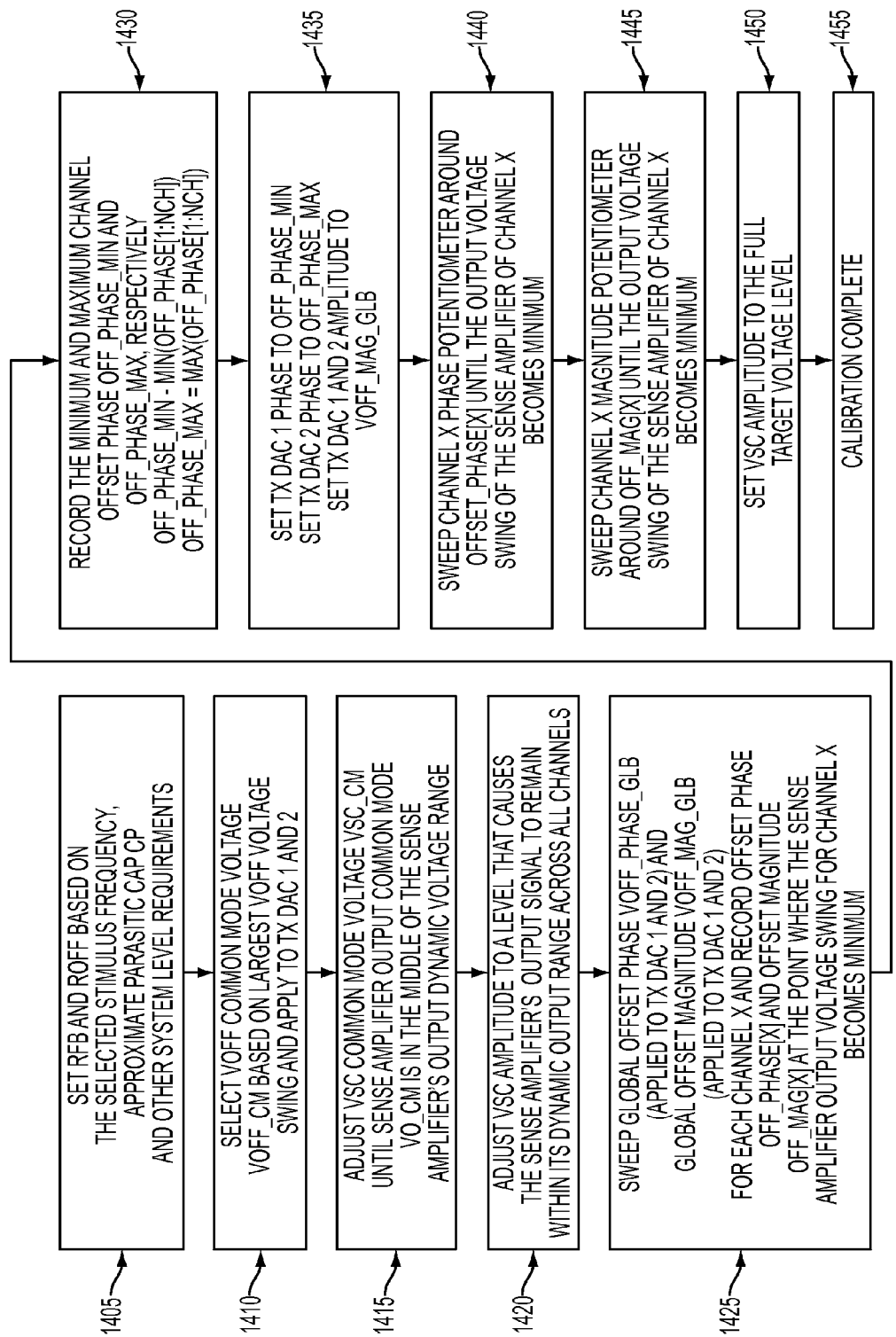
FIG. 14 illustrates an exemplary method to calibrate phase and magnitude adjustments in a parasitic capacitance cancelation signal according to various examples.

FIG. 14 illustrates an exemplary method for calibrating phase and magnitude adjustments of the cancelation signal Voff and the stimulation signal Vsc for a receive channel, as illustrated in FIGS. 4 and 5, for example. In the example of FIG. 14, the calibration method can be initiated by selecting an offset resistance Roff and sense amplifier feedback resistance Rfb (1405). Rfb and Roff can be selected based on the selected stimulus frequency, expected panel parasitic capacitance Cp, and other system requirements. System requirements can include, but are not limited to, headroom in the sense amplifier output for external interferers injected into the panel and therefore the inverting input of the sense amplifier. Next, the common mode level Voff_cm of the cancelation signal Voff and the common mode level Vsc_cm of the self capacitance signal Vsc can be adjusted so as to shift the sense amplifier output common mode voltage range to the middle of the sense amplifier's dynamic output range based on the selected Roff and Rfb (1410), (1415). The offset common mode voltage can be selected based on the maximum cancelation signal Voff voltage swing. The self capacitance signal Vsc magnitude (or amplitude) can be adjusted so as not to saturate the output of the sense amplifier of a given receive channel (1420).

A coarse cancelation signal Voff magnitude and phase sweep can be performed (1425). The global cancelation signal phase Voff PHASE_GLB (applied to the offset DACs 1 and 2) and the global cancelation signal magnitude Voff_MAG_GLB (applied to the offset DACs 1 and 2) can be swept. For each receive channel x, the cancelation signal phase Voff_PHASE[x] and magnitude Voff_MAG[x] can be recorded at which the output signal Vo voltage swing out of the sense amplifier of channel x becomes minimum and the optimum amount of cancellation is found. The minimum and maximum channel cancelation signal Voff phase Voff_PHASE_MIN and Voff_PHASE_MAX can be recorded (1430):

$$V\text{off\_PHASE\_MIN}=\text{MIN}(V\text{off\_PHASE}(1\text{:nch}))$$

$$V\text{off\_PHASE\_MAX}=\text{MAX}(V\text{off\_PHASE}(1\text{:nch})),$$

where nch=the total number of receive channels.

The offset DAC 1 phase can be set to Voff_PHASE_MIN and the offset DAC 2 phase can be set to Voff_PHASE_MAX and the magnitude of offset DAC 1 and 2 can be set to Voff_MAG_GLB (1435). Per channel fine phase adjustment can be achieved via the channel phase potentiometer. For each receive channel x, the phase potentiometer can be set to the coarse channel phase Voff_PHASE[x] and a fine calibration performed around Voff_PHASE[x] to find the optimum phase at which the sense amplifier output signal Vo voltage swing for channel x becomes minimum (1440). Per channel fine magnitude adjustment can be achieved via the channel magnitude potentiometer. For each receive channel x, the magnitude potentiometer can be set to the coarse channel magnitude Voff_MAG[x] and a fine calibration performed around Voff_MAG[x] to find the optimum amplitude at which the sense amplifier output signal Vo voltage swing for channel x becomes minimum (1445). The self capacitance signal Vsc level can be set to the target voltage level, which can be typically higher than the initial voltage level (1450). Because optimum cancelation has been achieved after calibration, the Vsc signal magnitude can be increased without saturation of the sense amplifier output. This can complete the calibration (1455).

Figure 15:
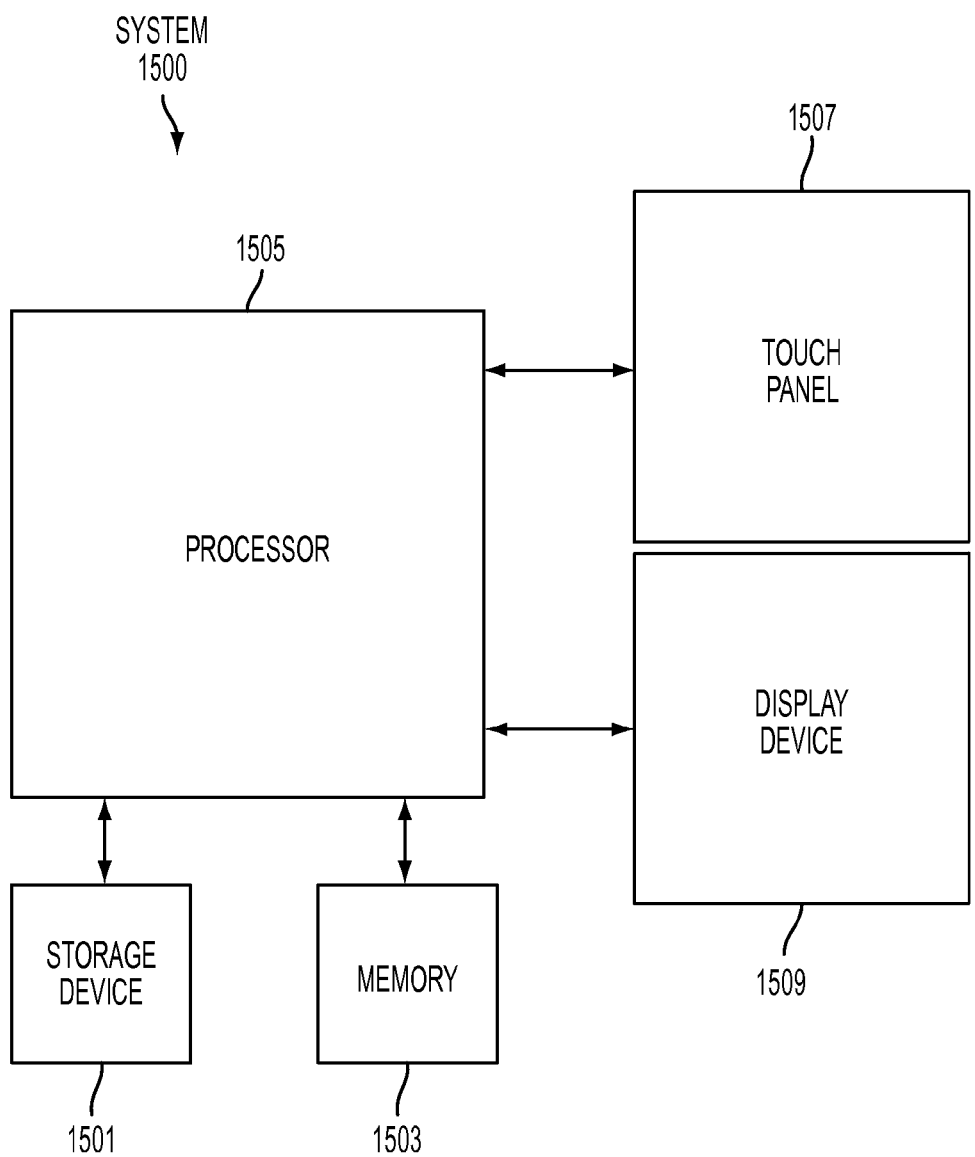
FIG. 15 illustrates an exemplary computer system that can perform self capacitance touch sensing according to various examples.

One or more of the circuits of FIGS. 3 through 12 can operate in a system similar or identical to system 1500 shown in FIG. 15. System 1500 can include instructions stored in a non-transitory computer readable storage medium, such as memory 1503 or storage device 1501, and executed by processor 1505. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 1500 can also include display device 1509 coupled to the processor 1505. The display device 1509 can be used to display a graphical user interface. The system 1500 can further include touch panel 1507 coupled to the processor 1505 and coupled to any one of the circuits of FIGS. 3 through 12. Touch panel 1507 can have touch nodes capable of detecting an object touching or hovering over the panel at a location corresponding to a graphical user interface on the display device 1509. The processor 1505 can process the outputs from the touch panel 1507 to perform actions based on the touch or hover event and the displayed graphical user interface.

It is to be understood that the system is not limited to the components and configuration of FIG. 15, but can include other or additional components in multiple configurations according to various examples. Additionally, the components of system 1500 can be included within a single device, or can be distributed between multiple devices. In some examples, the processor 1505 can be located within the touch panel 1507 and/or the display device 1509.

Figure 16:
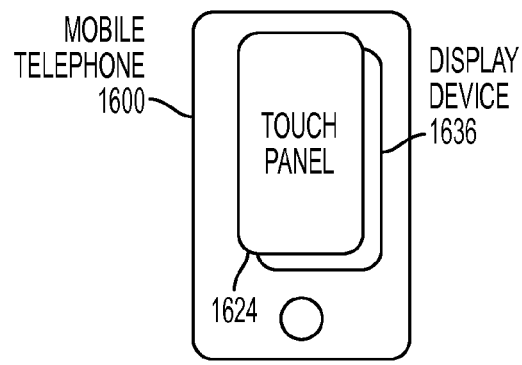
FIGS. 16 through 18 illustrate exemplary personal devices that can perform self capacitance touch sensing according to various examples.

FIG. 16 illustrates an exemplary mobile telephone 1600 that can include touch panel 1624, display 1636, and other computing system blocks that can cancel the effects of parasitic capacitance in the touch panel according to various examples.

Figure 17:
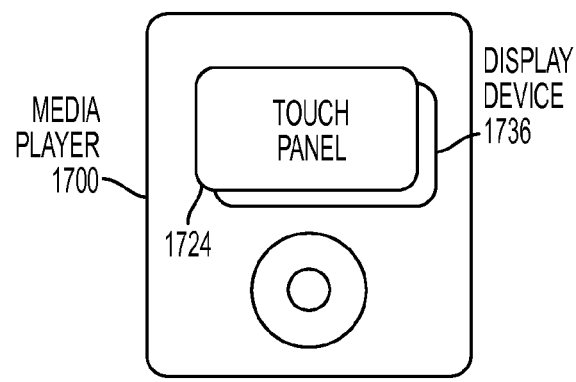

FIG. 17 illustrates an exemplary digital media player 1700 that can include touch panel 1724, display 1736, and other computing system blocks that can cancel the effects of parasitic capacitance in the touch panel according to various examples.

Figure 18:
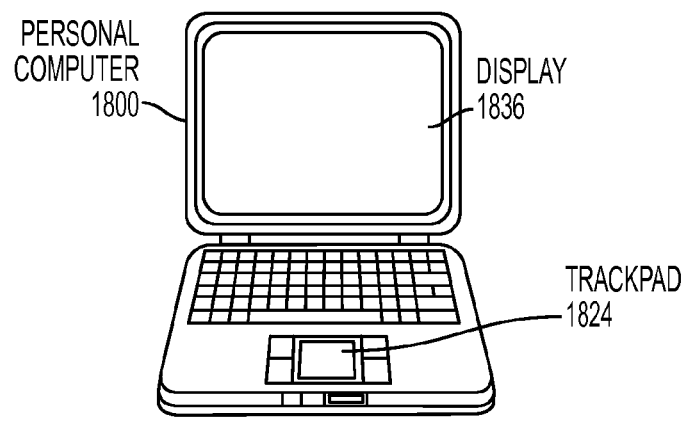

FIG. 18 illustrates an exemplary personal computer 1800 that can include touch panel (trackpad) 1824, display 1836, and other computing system blocks that can cancel the effects of parasitic capacitance in the touch panel according to various examples.

The mobile telephone, media player, and personal computer of FIGS. 16 through 18 can advantageously realize improved signal-to-noise ratios in self capacitance touch signals, a high dynamic sensing range, and power savings.

Therefore, according to the above, some examples of the disclosure are directed to a touch sensitive device comprising: a cancelation circuit capable of generating a cancelation signal based on parasitic capacitance affecting a self capacitance signal and coupling the cancelation signal to the self capacitance signal so as to cancel the parasitic capacitance from the self capacitance signal; and a sense circuit capable of receiving the self capacitance signal with the parasitic capacitance canceled therefrom and a stimulation signal, and outputting a touch signal in response to the self capacitance signal with the parasitic capacitance canceled therefrom and the stimulation signal. Additionally or alternatively to one or more examples disclosed above, the cancelation circuit comprises a voltage source capable of generating the cancelation signal to offset a parasitic current associated with the parasitic capacitance. Additionally or alternatively to one or more examples disclosed above, the cancelation circuit comprises: a voltage source capable of generating first and second voltage signals, the first voltage signal having a first phase and the second voltage signal having a second phase; a phase adjustment circuit capable of receiving the first and second voltage signals, generating a third voltage signal from the first and second voltage signals, and adjusting a phase of the third voltage signal to be between the first and second phases; and a magnitude adjustment circuit capable of receiving the third voltage signal, generating the cancelation signal from the third voltage signal, and adjusting a magnitude of the cancelation signal. Additionally or alternatively to one or more examples disclosed above, the cancelation circuit comprises: a first voltage source capable of generating first and second voltage signals, the first voltage signal having a first phase and the second voltage signal having a second phase; a phase adjustment circuit capable of receiving the first and second voltage signals, generating the cancelation signal from the first and second voltage signals, and adjusting a phase of the cancelation signal to be between the first and second phases; a second voltage source capable of generating the stimulation signal; and a magnitude adjustment circuit capable of receiving the stimulation signal and adjusting a magnitude of the stimulation signal; wherein the cancelation circuit is capable of coupling the phase-adjusted cancelation signal to the self capacitance signal, and wherein the sense circuit is capable of receiving the magnitude-adjusted stimulation signal. Additionally or alternatively to one or more examples disclosed above, the cancelation circuit comprises: a first adjustment circuit capable of setting a phase of the cancelation signal to a global value; and a second adjustment circuit capable of adjusting a phase of the stimulation signal. Additionally or alternatively to one or more examples disclosed above, the cancelation circuit comprises: a magnitude adjustment circuit capable of adjusting a magnitude of the cancelation signal; and a phase adjustment circuit capable of adjusting a phase of the stimulation signal. Additionally or alternatively to one or more examples disclosed above, the cancelation circuit comprises a voltage source capable of generating the cancelation signal to cancel the parasitic capacitance associated with a guard plate of the device. Additionally or alternatively to one or more examples disclosed above, the cancelation circuit comprises a voltage source capable of generating the cancelation signal to cancel the parasitic capacitance associated with a touch electrode in the panel. Additionally or alternatively to one or more examples disclosed above, the sense circuit comprises: a first buffer capable of receiving the self capacitance signal with the parasitic capacitance canceled therefrom and the stimulation signal, and outputting a buffer signal in response to the self capacitance signal and the stimulation signal; a second buffer capable of receiving the buffer signal and outputting the touch signal in response to the buffer signal; and a voltage source capable of powering the first and second buffers in a power-saving mode. Additionally or alternatively to one or more examples disclosed above, the sense circuit comprises: a first buffer capable of receiving the self capacitance signal with the parasitic capacitance canceled therefrom and the stimulation signal, and outputting a buffer signal in response to the self capacitance signal and the stimulation signal; a second buffer capable of receiving the buffer signal and outputting the touch signal in response to the buffer signal; a first voltage source capable of powering the first buffer at a first voltage; and a second voltage source capable of powering the second buffer at a second voltage, the second voltage being substantially lower than the first voltage. Additionally or alternatively to one or more examples disclosed above, the device further comprises an amplifier coupled to the sense circuit and capable of supplying a voltage signal to the sense circuit to intermittently boost power to the sense circuit. Additionally or alternatively to one or more examples disclosed above, the device further comprises a touch panel capable of generating the self capacitance signal affected by the parasitic capacitance, the self capacitance signal indicative of an object proximate to the panel. Additionally or alternatively to one or more examples disclosed above, the cancelation signal and the stimulation signal have independently programmable common mode voltage levels to shift a common mode level at the sense circuit substantially below an input common mode level of the sense circuit. Additionally or alternatively to one or more examples disclosed above, the device can be at least one of a mobile phone, a digital player, or a portable computer.

Other examples of the disclosure are directed to a touch sensitive device comprising: a cancelation circuit capable of generating a cancelation signal based on parasitic capacitance affecting a self capacitance signal, calibrating the cancelation signal, and coupling the calibrated cancelation signal to the self capacitance signal so as to cancel the parasitic capacitance on the self capacitance signal; and a sense circuit capable of receiving the coupled calibrated cancelation and self capacitance signal and a stimulation signal and outputting an output signal in response to the coupled signal and the stimulation signal, wherein the cancelation circuit calibrates the cancelation signal so as to minimize the output signal. Additionally or alternatively to one or more of the examples disclosed above, the cancelation circuit comprises a voltage source capable of calibrating the cancelation signal by adjusting the cancelation signal to offset a parasitic current associated with the parasitic capacitance. Additionally or alternatively to one or more of the examples disclosed above the cancelation circuit comprises a numerically controlled oscillator and a programmable push/pull current source configured to generate a cancellation signal. Additionally or alternatively to one or more of the examples disclosed above, the cancelation circuit comprises: a phase adjustment circuit capable of calibrating the cancelation signal by adjusting a phase of the cancelation signal; and a magnitude adjustment circuit capable of calibrating the cancelation signal by adjusting a magnitude of the cancelation signal. Additionally or alternatively to one or more of the examples disclosed above, the cancelation circuit comprises: a phase adjustment circuit capable of calibrating the cancelation signal by adjusting a phase of the cancelation signal; and a magnitude adjustment circuit capable of calibrating the cancelation signal by adjusting a magnitude of the stimulation signal and causing the phase adjustment circuit to adjust the phase of the cancelation signal in response thereto. Additionally or alternatively to one or more of the examples disclosed above, the cancelation circuit comprises: a phase adjustment circuit capable of calibrating the stimulation signal by adjusting a phase of the stimulation signal and causing a phase of the cancelation signal to adjust in response thereto; and a magnitude adjustment circuit capable of calibrating the stimulation signal by adjusting a magnitude of the stimulation signal and causing a magnitude of the cancelation signal to adjust in response thereto. Additionally or alternatively to one or more of the examples disclosed above, the cancelation circuit comprises a voltage source capable of calibrating the cancelation signal by adjusting a voltage signal to a guard plate of the device so as to cancel the parasitic capacitance associated with the panel and the guard plate. Additionally or alternatively to one or more of the examples disclosed above, the cancelation circuit comprises a voltage source capable of calibrating the cancelation signal by adjusting a voltage signal to a touch electrode of the panel so as to cancel the parasitic capacitance associated with the touch electrode.

Other examples of the disclosure are directed to a system for canceling effects of parasitic capacitance in a touch sensitive device, the system comprising: a cancelation circuit capable of generating a cancelation signal based on parasitic capacitance affecting a self capacitance signal and using the cancelation signal to cancel the parasitic capacitance from the self capacitance signal; and a voltage circuit capable of generating a stimulation signal to facilitate the cancellation of the parasitic capacitance and multiple voltage signals to drive the cancelation circuit to generate the cancelation signal. Additionally or alternatively to one or more of the examples disclosed above, the voltage circuit comprises: a first voltage source capable of generating the stimulation signal; a second voltage source capable of generating the multiple voltage signals; and a multiplexer capable of selectively coupling the multiple voltage signals to the cancelation circuit to facilitate the cancelation circuit generating the cancelation signal. Additionally or alternatively to one or more of the examples disclosed above, the device is capable of operating in multiple modes based on which of the multiple voltage signals is selected to drive the cancelation circuit. Additionally or alternatively to one or more of the examples disclosed above, the system further comprises: a transmit section capable of driving the device to generate the self capacitance signal; and a receive section capable of receiving and processing the generated self capacitance signal, wherein one or more portions of the voltage circuit is located in at least one of the transmit section, the receive section, or both, and wherein one or more portions of the cancelation circuit is located in at least one of the transmit section, the receive section, or both. Additionally or alternatively to one or more of the examples disclosed above, the system further comprises a touch panel capable of generating the self capacitance signal indicative of an object proximate to the panel.

Other examples of the disclosure are directed to a method for canceling effects of parasitic capacitance in a touch sensitive device, the method comprising: generating a self capacitance signal indicative of an object proximate to the panel, the self capacitance signal being affected by a parasitic capacitance; generating a cancelation signal at a cancelation circuit based on the parasitic capacitance; coupling the cancelation signal with the self capacitance signal to cancel the parasitic capacitance therefrom; and generating a touch signal indicative of the proximate object at a sense circuit in response to a first input of the self capacitance signal with the parasitic capacitance canceled therefrom and a second input of a stimulation signal. Additionally or alternatively to one or more of the examples disclosed above, the method further comprises calibrating the cancelation signal at the cancelation circuit based on the parasitic capacitance. Additionally or alternatively to one or more of the examples disclosed above, the method further comprises operating the sense circuit in a power-saving mode.

Other examples of the disclosure are directed to a touch sensing system comprising: a cancelation circuit capable of generating a cancelation signal and using the cancelation signal to cancel parasitic capacitance from a self capacitance signal generated at a touch node; and a receive circuit capable of receiving the self capacitance signal and a stimulation signal, and outputting a touch signal in response to the self capacitance signal and the stimulation signal. Additionally or alternatively to one or more of the examples disclosed above, a phase of the stimulation signal is the same as a phase of the self capacitance signal; and a magnitude of the stimulation signal is the same as a magnitude of the self capacitance signal. Additionally or alternatively to one or more of the examples disclosed above, the self capacitance signal and the stimulation signal are substantially non-zero and the touch signal is substantially zero. Additionally or alternatively to one or more of the examples disclosed above, the touch signal has a voltage at a common mode voltage of the system. Additionally or alternatively to one or more of the examples disclosed above, phases of the stimulation signal and the cancelation signal are the same. Additionally or alternatively to one or more of the examples disclosed above, the system further comprises a touch panel including the touch node.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A touch sensitive device comprising:
   a cancelation circuit comprising a numerically controlled oscillator coupled to an input of a push/pull current source, the push/pull current source capable of generating a cancelation signal based on parasitic capacitance affecting a self capacitance signal, wherein:
     the cancelation circuit is configured to generate a time-varying signal and scale the time-varying signal to generate an amplitude-controlled time-varying signal based on the parasitic capacitance to adjust a magnitude of the cancelation signal, the amplitude-controlled time-varying signal controlling the magnitude of the cancelation signal generated by the push/pull current source, and
     the cancelation signal is coupled to the self capacitance signal so as to cancel the parasitic capacitance from the self capacitance signal; and
   a sense circuit capable of receiving the self capacitance signal with the parasitic capacitance canceled therefrom and a stimulation signal, and outputting a touch signal in response to the self capacitance signal with the parasitic capacitance canceled therefrom and the stimulation signal.

2. The device of claim 1, wherein the cancelation circuit comprises:
   a magnitude adjustment circuit capable of receiving the time-varying signal from the numerically controlled oscillator, adjusting a magnitude of the time-varying signal, and outputting the amplitude-controlled time-varying signal to the input of the push/pull current source.

3. The device of claim 1, wherein the cancelation circuit comprises:
   a common mode adjustment circuit capable of receiving the time-varying signal from the numerically controlled oscillator, adjusting a common mode of the time-varying signal, and outputting the adjusted signal to the push/pull current source.

4. The device of claim 1, wherein the cancelation circuit comprises:
   a voltage source capable of generating the cancelation signal to cancel the parasitic capacitance associated with a guard plate of the device.

5. The device of claim 1, wherein:
   the numerically controlled oscillator generates the time-varying signal, coupled to the input of the push/pull current source, to control the push/pull current source configured to generate the cancellation signal.

6. The device of claim 1, wherein the sense circuit comprises:
   a first buffer capable of receiving the self capacitance signal with the parasitic capacitance canceled therefrom and the stimulation signal, and outputting a buffer signal in response to the self capacitance signal and the stimulation signal;
   a second buffer capable of receiving the buffer signal and outputting the touch signal in response to the buffer signal; and
   a voltage source capable of powering the first and second buffers in a power-saving mode.

7. The device of claim 1, wherein the sense circuit comprises:
   a first buffer capable of receiving the self capacitance signal with the parasitic capacitance canceled therefrom and the stimulation signal, and outputting a buffer signal in response to the self capacitance signal and the stimulation signal;
   a second buffer capable of receiving the buffer signal and outputting the touch signal in response to the buffer signal;
   a first voltage source capable of powering the first buffer at a first voltage; and
   a second voltage source capable of powering the second buffer at a second voltage, the second voltage being substantially lower than the first voltage.

8. The device of claim 1, further comprising:
   an amplifier coupled to the sense circuit and capable of supplying a voltage signal to the sense circuit to intermittently boost power to the sense circuit.

9. The device of claim 1, further comprising:
   a touch panel capable of generating the self capacitance signal affected by the parasitic capacitance, the self capacitance signal indicative of an object proximate to the panel.

10. The device of claim 1, wherein the cancelation signal and the stimulation signal have independently programmable common mode voltage levels to shift a common mode level at the sense circuit substantially below an input common mode level of the sense circuit.

11. The device of claim 1 being at least one of a mobile phone, a digital player, or a portable computer.

12. The device of claim 1, wherein:
   the cancelation circuit is further capable of calibrating the cancelation signal, and coupling the calibrated cancelation signal to the self capacitance signal so as to cancel the parasitic capacitance on the self capacitance signal,
   the sense circuit is further capable of receiving the coupled calibrated cancelation signal and outputting the touch signal in response to the coupled cancelation signal and the stimulation signal, and
   the cancelation circuit calibrates the cancelation signal so as to minimize the outputted touch signal.

13. The device of claim 12, wherein:
   the numerically controlled oscillator is further capable of calibrating the cancelation signal by adjusting the time-varying signal to control the push/pull current source to adjust the cancelation signal to offset a parasitic current associated with the parasitic capacitance.

14. The device of claim 12, wherein the cancelation circuit comprises:
a magnitude adjustment circuit capable of receiving a signal from the numerically controlled oscillator, adjusting a magnitude of the signal, and outputting the adjusted signal to the push/pull current source.

15. The device of claim 12, wherein the cancelation circuit comprises:
a first input to the numerically controlled oscillator configured to adjust a phase of an output from the numerically controlled oscillator and a second input to the numerically controlled oscillator configured to adjust a frequency of the output from the numerically controlled oscillator.

16. The device of claim 12, wherein the cancelation circuit comprises:
a voltage source capable of calibrating the cancelation signal by adjusting a voltage signal to a guard plate of the device so as to cancel the parasitic capacitance associated with the panel and the guard plate.

17. The device of claim 12, wherein the cancelation circuit comprises:
a voltage source capable of calibrating the cancelation signal by adjusting a voltage signal to a touch electrode of the panel so as to cancel the parasitic capacitance associated with the touch electrode.

18. The device of claim 12, wherein the cancelation circuit comprises a common mode adjustment circuit capable of receiving a signal from the numerically controlled oscillator, adjusting a common mode of the signal, and outputting the adjusted signal to the push/pull current source.

19. The device of claim 1, wherein the cancelation circuit comprises a first input to the numerically controlled oscillator configured to set a phase of an output from the numerically controlled oscillator and a second input to the numerically controlled oscillator configured to set a frequency of the output from the numerically controlled oscillator.

20. A method for canceling effects of parasitic capacitance in a touch sensitive panel, the method comprising:
generating a self capacitance signal indicative of an object proximate to the panel, the self capacitance signal being affected by a parasitic capacitance;
generating, with a push/pull current source, a cancelation signal at a cancelation circuit comprising a numerically controlled oscillator coupled to an input of the push/pull current source based on the parasitic capacitance, wherein the cancelation circuit is configured to generate a time-varying signal and scale the time-varying signal to generate an amplitude-controlled time-varying signal based on the parasitic capacitance to adjust the magnitude of the cancelation signal, the amplitude-controlled time-varying signal controlling the magnitude of the cancelation signal generated by the push/pull current source;
coupling the cancelation signal with the self capacitance signal to cancel the parasitic capacitance therefrom; and
generating a touch signal indicative of the proximate object at a sense circuit in response to a first input of the self capacitance signal with the parasitic capacitance canceled therefrom and a second input of a stimulation signal.

21. The method of claim 20, further comprising:
calibrating the cancelation signal at the cancelation circuit based on the parasitic capacitance.

22. A touch sensing system comprising:
a cancelation circuit comprising a numerically controlled oscillator coupled to an input of a push/pull current source capable of generating a cancelation signal based on a parasitic capacitance, the cancelation circuit configured to generate a time-varying signal and scale the time-varying signal to generate an amplitude-controlled time-varying signal based on the parasitic capacitance to adjust a magnitude of the cancelation signal, the amplitude-controlled time-varying signal controlling the magnitude of the cancelation signal generated by the push/pull current source;
the cancelation circuit capable of using the cancelation signal to cancel the parasitic capacitance from a self capacitance signal generated at a touch node; and
a receive circuit capable of receiving the self capacitance signal and a stimulation signal, and outputting a touch signal in response to the self capacitance signal and the stimulation signal.

23. The system of claim 22, wherein a phase of the stimulation signal is the same as a phase of the self capacitance signal; and
wherein a magnitude of the stimulation signal is the same as a magnitude of the self capacitance signal.

* * * * *